(12) United States Patent
Cravener et al.

(10) Patent No.: US 12,214,860 B2
(45) Date of Patent: Feb. 4, 2025

(54) PITCH-FOLD LOCK

(71) Applicant: Textron Innovations Inc., Providence, RI (US)

(72) Inventors: Kyle Thomas Cravener, Arlington, TX (US); Andrew Ryan Maresh, Colleyville, TX (US); Brady Garrett Atkins, Euless, TX (US); Kynn J. Schulte, Arlington, TX (US); Troy Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 16 days.

(21) Appl. No.: 18/059,002

(22) Filed: Nov. 28, 2022

(65) Prior Publication Data

US 2023/0101186 A1    Mar. 30, 2023

Related U.S. Application Data

(62) Division of application No. 16/879,114, filed on May 20, 2020, now Pat. No. 11,511,848.

(51) Int. Cl.
  *B64C 11/28*    (2006.01)
  *B64C 11/06*    (2006.01)
  *B64C 29/00*    (2006.01)

(52) U.S. Cl.
  CPC ............ *B64C 11/28* (2013.01); *B64C 11/065* (2013.01); *B64C 29/0033* (2013.01)

(58) Field of Classification Search
  CPC ... B64C 11/28; B64C 11/065; B64C 29/0033; B64C 11/06
  See application file for complete search history.

(56) References Cited

U.S. PATENT DOCUMENTS

| | | | |
|---|---|---|---|
| 3,187,818 A | 6/1965 | Barrett et al. | |
| 3,247,907 A | 4/1966 | Mosinskis | |
| 4,738,592 A | 4/1988 | Cavanaugh | |
| 5,031,858 A | 7/1991 | Schellhase et al. | |
| 5,868,351 A | 2/1999 | Stamps et al. | |
| 2011/0278778 A1* | 11/2011 | Qattan | F16F 3/00 267/171 |
| 2016/0152329 A1* | 6/2016 | Tzeng | B64C 11/28 29/889.1 |
| 2017/0144746 A1* | 5/2017 | Schank | B64D 27/20 |

* cited by examiner

*Primary Examiner* — Woody A Lee, Jr.
*Assistant Examiner* — Eric A Lange
(74) *Attorney, Agent, or Firm* — Fogarty LLP

(57) ABSTRACT

Embodiments are directed to a blade lock comprising a fold lock adapted to prevent folding of a rotor blade in a fold-lock position and to allow folding of the rotor blade in a pitch-lock position. The blade lock further comprises a pitch lock adapted to allow pitch movement of a rotor blade in a fold-lock position and to prevent pitch movement of the rotor blade in the pitch-lock position. A spring-loaded link pivotally connects both the fold lock and the pitch lock and is adapted to provide passive, overcenter locking in the fold-lock position. An actuator is coupled to the pitch lock and is adapted to move the pitch lock and the fold lock between the fold-lock and pitch-lock positions.

9 Claims, 21 Drawing Sheets

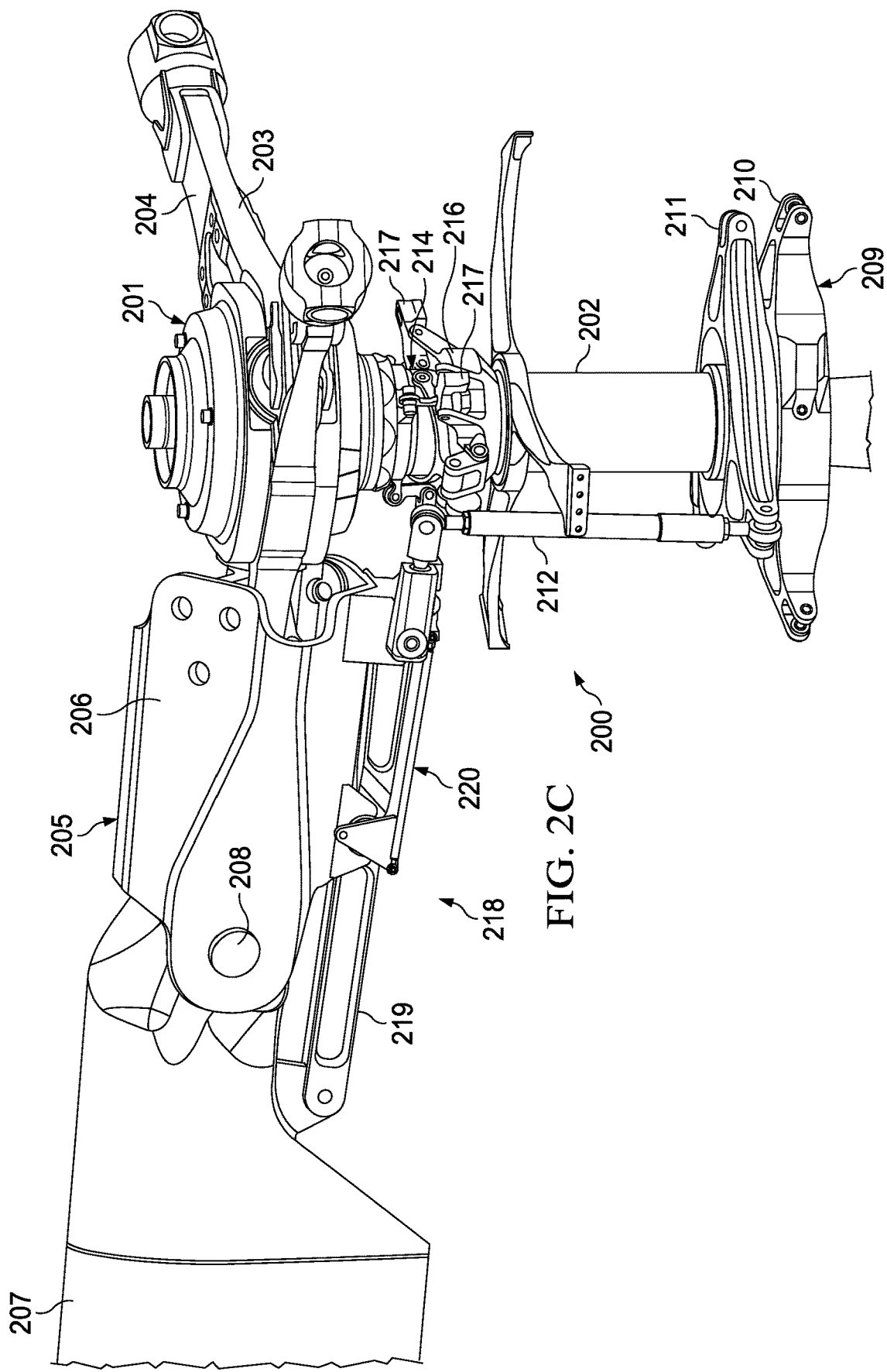

PITCH-FOLD LOCK

CROSS-REFERENCE TO RELATED APPLICATION

This application is a divisional of, and claims benefit of, U.S. patent application Ser. No. 16/879,114, filed May 20, 2020, which is hereby incorporated herein by reference in its entirety.

BACKGROUND

Fixed-wing aircraft, such as airplanes, are capable of flight using wings that generate lift in response to the forward airspeed of the aircraft. The forward airspeed is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering, and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

Tiltrotor aircraft are hybrids between traditional helicopters and traditional propeller driven aircraft. During airplane mode of the tiltrotor, forward speed and range is limited by certain fundamental limitations of the rotor systems.

SUMMARY

Embodiments are directed to a blade lock or pitch-fold lock for a tiltrotor aircraft that enables and disables a folding degree of freedom and a pitching degree of freedom of a rotor blade. The blade lock comprises a fold lock adapted to prevent folding of a rotor blade in a fold-lock position and to allow folding of the rotor blade in a pitch-lock position. The blade lock further comprises a pitch lock adapted to allow pitch movement of a rotor blade in a fold-lock position and to prevent pitch movement of the rotor blade in the pitch-lock position. A spring-loaded link pivotally connects both the fold lock and the pitch lock and is adapted to provide passive, overcenter locking in the fold-lock position. An actuator is coupled to the pitch lock and is adapted to move the pitch lock and the fold lock between the fold-lock and pitch-lock positions.

The actuator may be a low-profile crank actuator having an actuator arm and an activation linkage that is coupled to the pitch lock, wherein the actuator arm and activation linkage are adapted to provide passive, overcenter locking in the pitch-lock position.

The actuator may be a rotary actuator having an actuator arm and an overslung activation linkage that is coupled to the pitch lock, wherein the actuator arm and overslung activation linkage are adapted to provide passive, overcenter locking in the pitch-lock position.

The actuator may be a rotary actuator having an actuator arm and an underslung activation linkage that is coupled to the pitch lock, wherein the actuator arm and underslung activation linkage are adapted to provide passive, overcenter locking in the pitch-lock position.

The actuator may be a linear actuator having an actuator shaft that is coupled to the pitch lock.

The blade lock may further comprise a blade-fold link coupled to the rotor blade, wherein the fold lock enables and disables the folding degree of freedom by unlocking and locking the blade-fold link.

The pitch lock may further comprise a rotor cuff tab and a blade-stop tab, wherein the pitch lock enables and disables the pitching degree of freedom by unlocking and locking the rotor cuff tab and the blade-stop tab together.

The blade lock may further comprise an attachment point on the pitch lock. The attachment point is separated from a pivot axis of the pitch lock by a distance, and both the spring-loaded link and the actuator are pivotally connected to the attachment point.

The blade lock may further comprise a first attachment point on the pitch lock. The first attachment point is separated from a pivot axis of the pitch lock by a first distance. The blade lock may further comprise a second attachment point on the pitch lock. The second attachment point is separated from the pivot axis of the pitch lock by a second distance that is shorter or longer than the first distance. The spring-loaded link is pivotally connected to the first attachment point and the actuator is pivotally connected to the second attachment point.

A method for enabling and disabling a folding degree of freedom and a pitching degree of freedom of a rotor blade of a tiltrotor aircraft comprises rotating a blade lock assembly comprising a spring-loaded link pivotally connecting a pitch lock to a fold lock from a pitch-lock position to a fold-lock position. In the fold-lock position, the spring-loaded link provides passive, overcenter locking to the fold lock. The method further comprises rotating the blade lock assembly from the fold-lock position to the pitch-lock position. In the pitch-lock position, a blade lock actuator provides passive, overcenter locking to the pitch lock. The method may further comprise, in the fold-lock position, locking a blade-fold link coupled to the rotor blade to disable the folding degree of freedom. The method may further comprise, in the pitch-lock position, locking a rotor cuff tab and a blade-stop tab together to disable the pitching degree of freedom.

BRIEF DESCRIPTION OF THE DRAWINGS

Figure 1A:
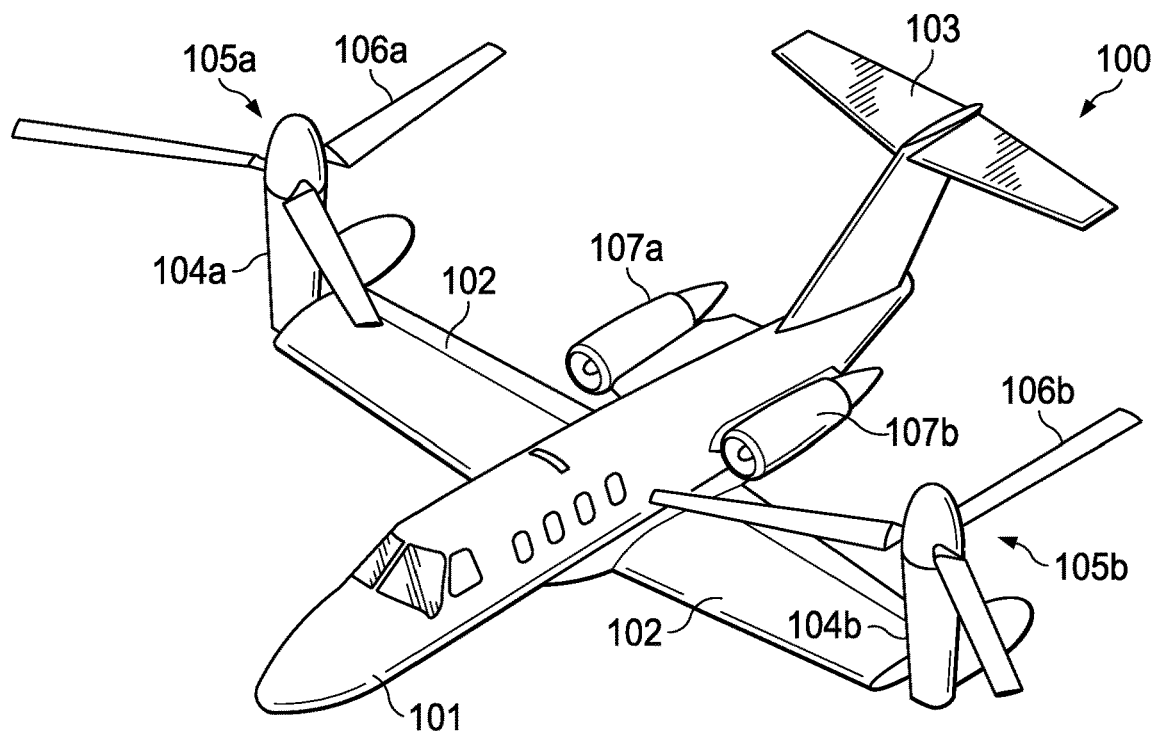
Figure 1B:
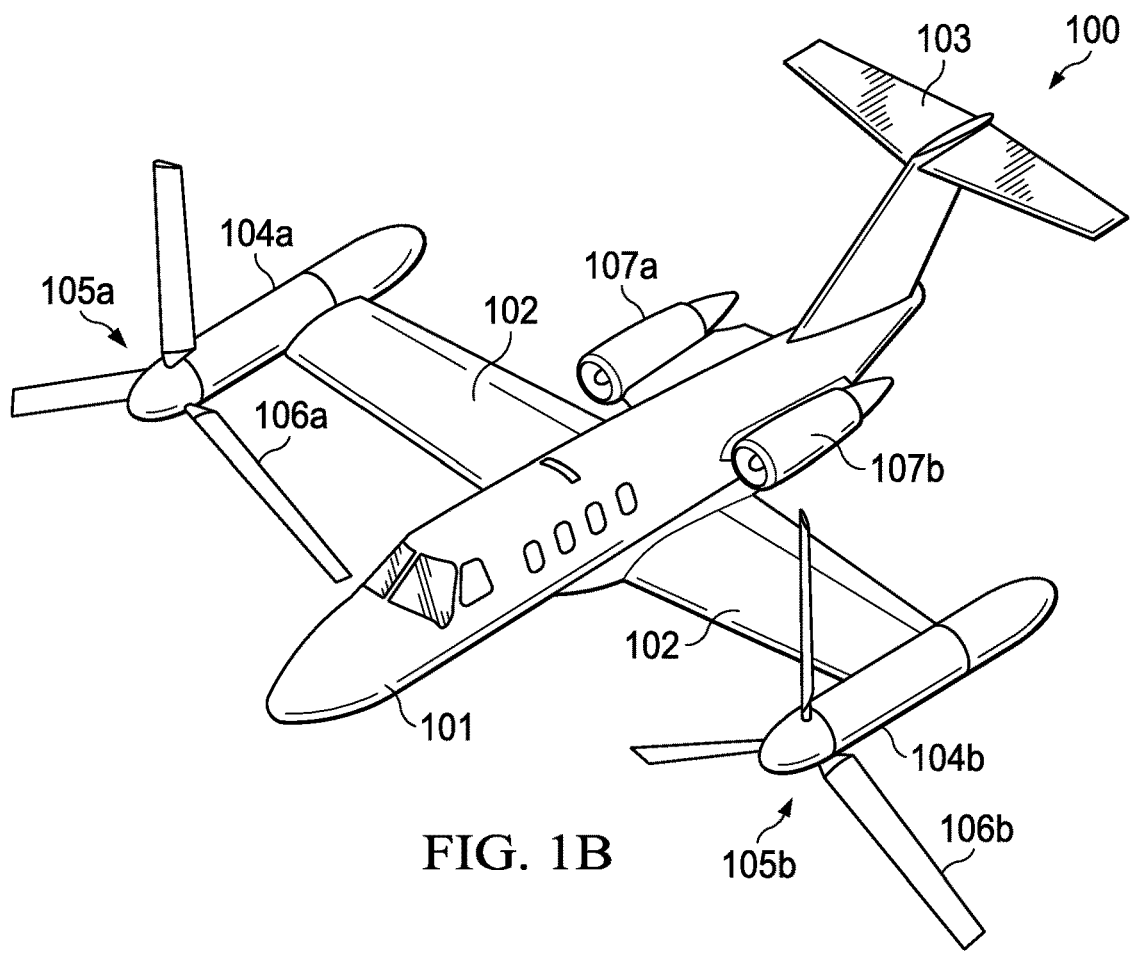
Figure 1C:
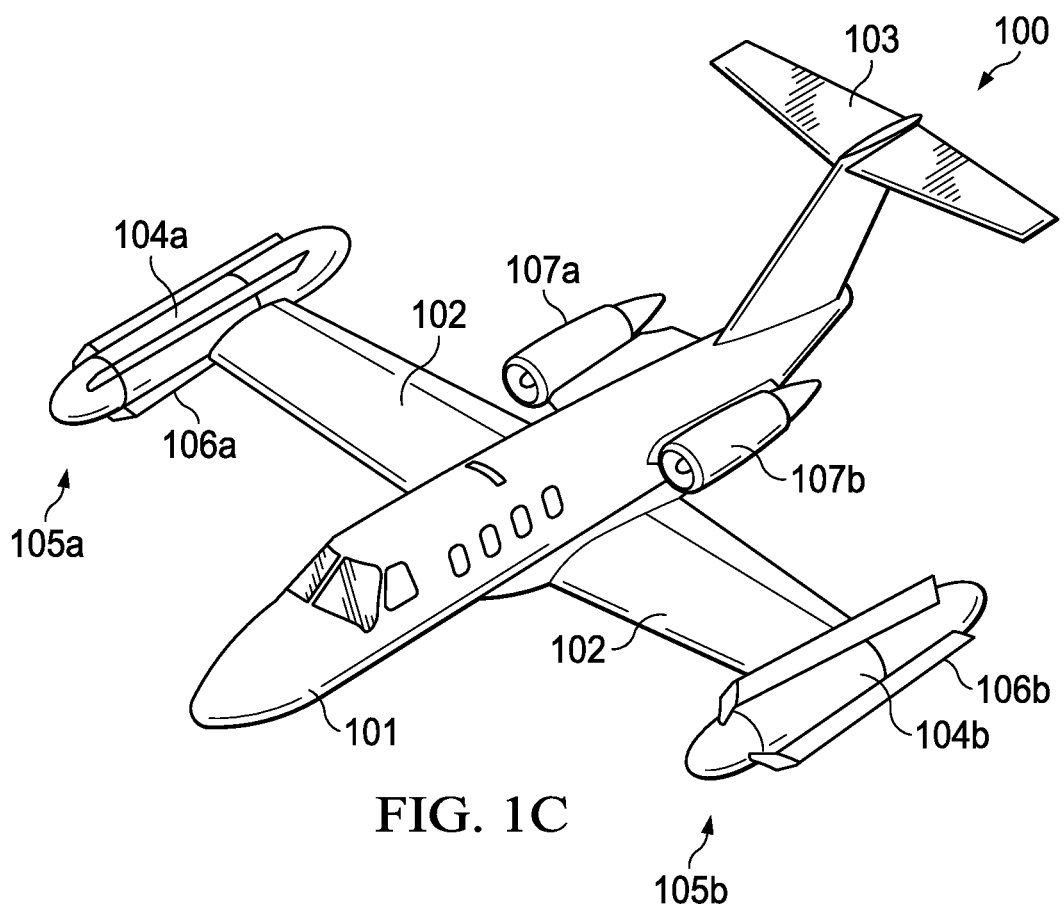

Having thus described the invention in general terms, reference will now be made to the accompanying drawings, which are not necessarily drawn to scale, and wherein:

FIGS. 1A-1C illustrates a tiltrotor aircraft in various rotary and non-rotary flight modes.

FIGS. 2A-2D illustrate an exemplary mechanism 200 for transitioning a tiltrotor aircraft between rotary and non-rotary flight modes.

Figure 3A:
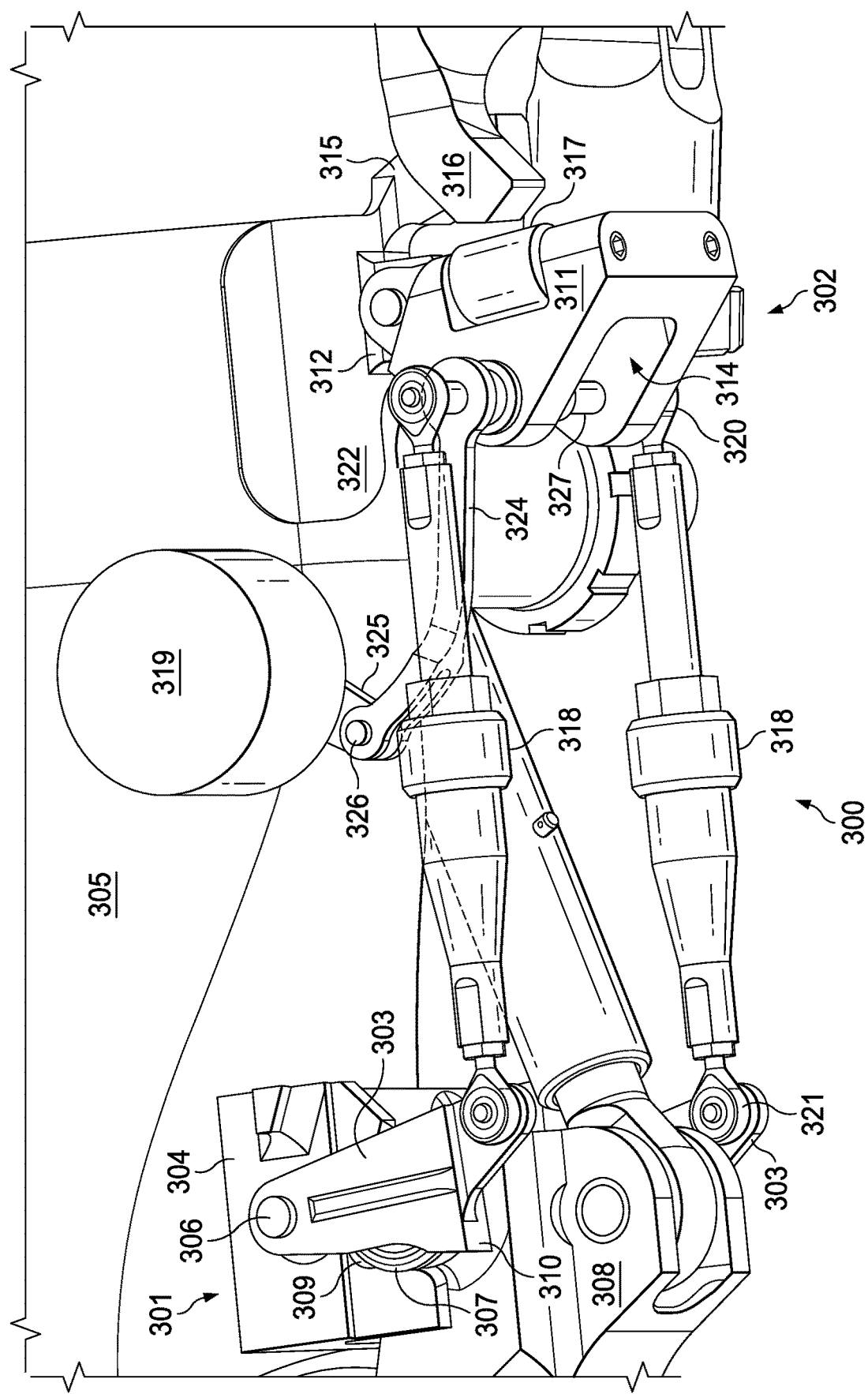
Figure 3B:
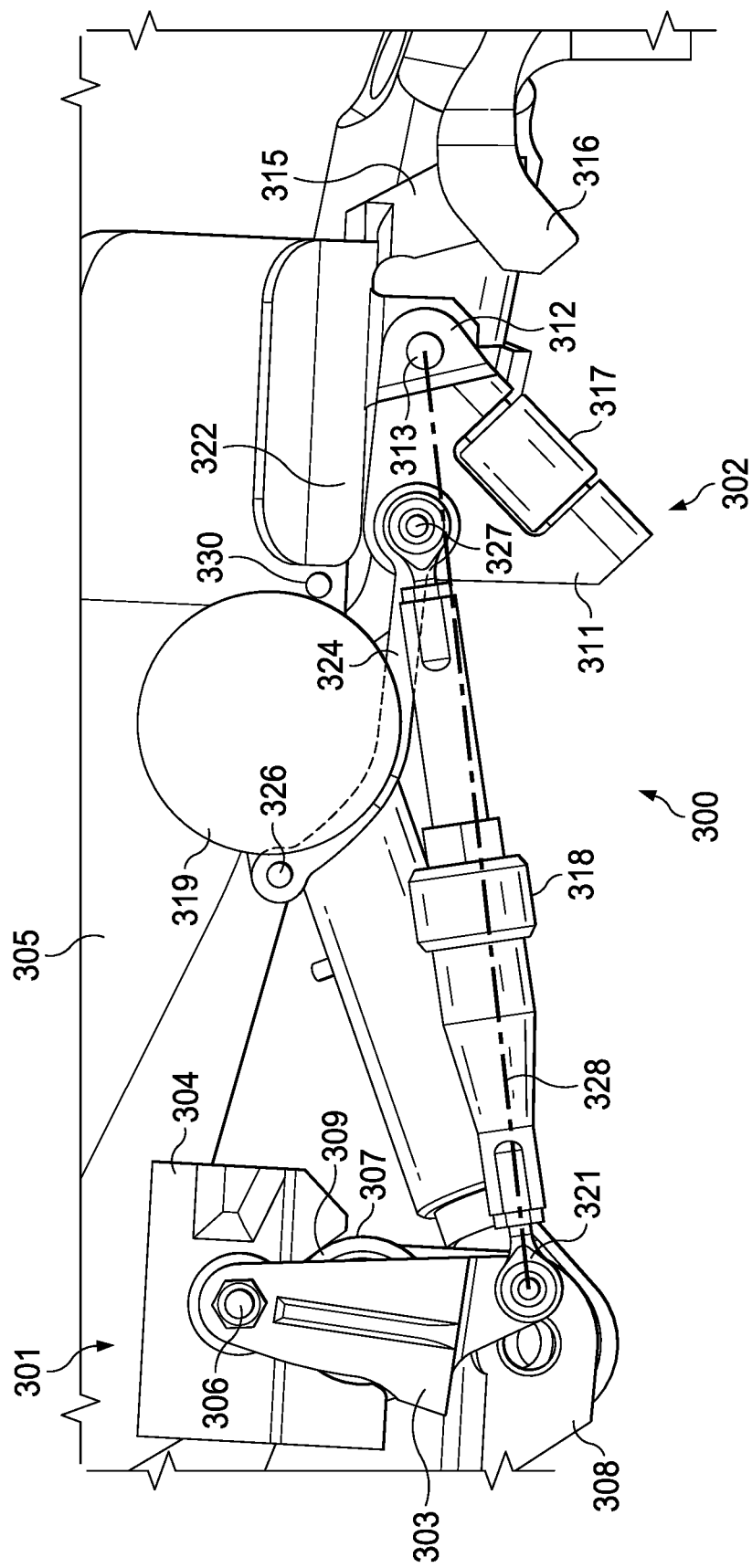
Figure 3C:
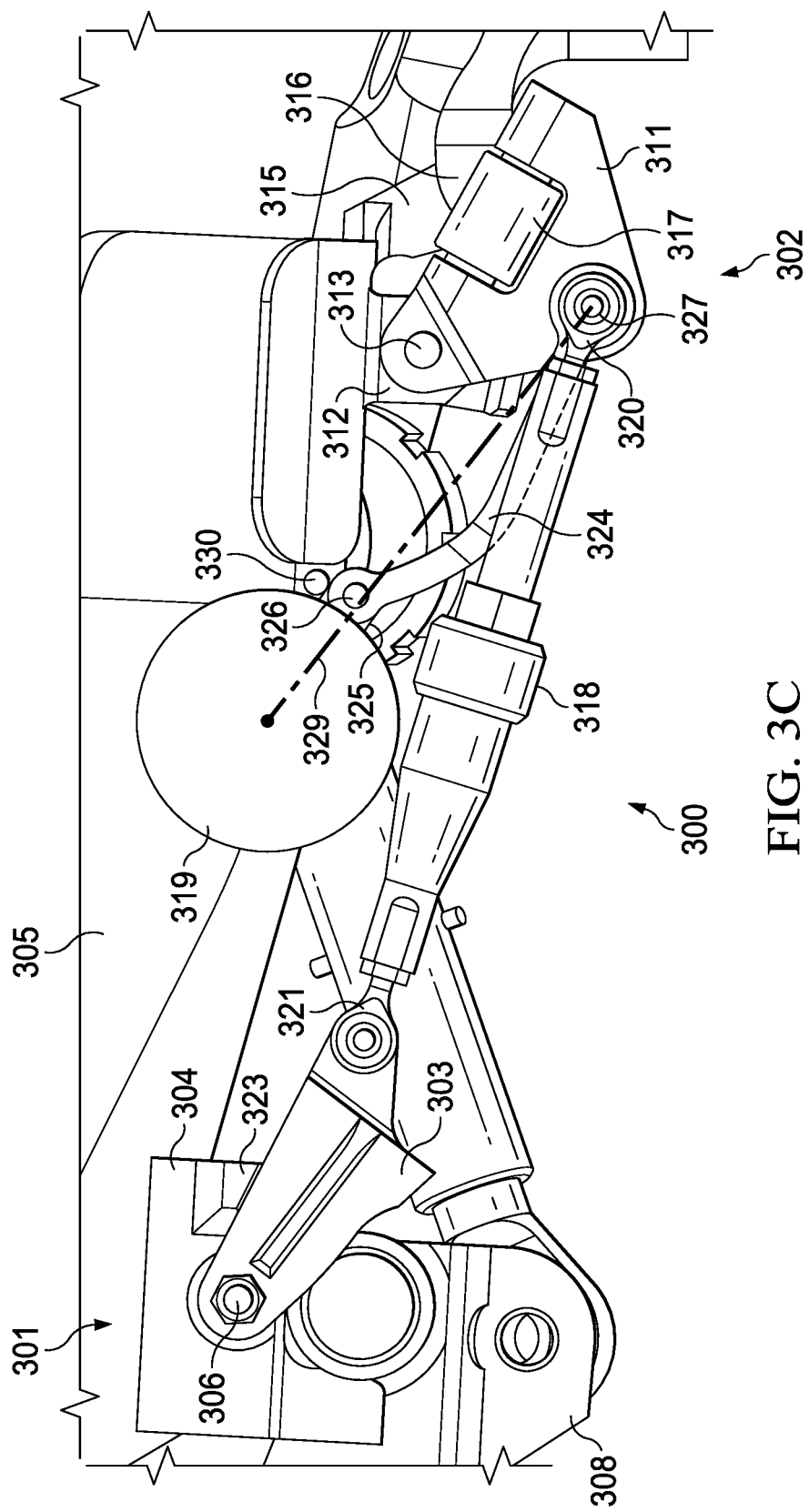

FIGS. 3A-3C illustrate an exemplary pitch-fold lock utilizing a low-profile crank actuator to move between a fold-locked position and a pitch-locked position.

Figure 4A:
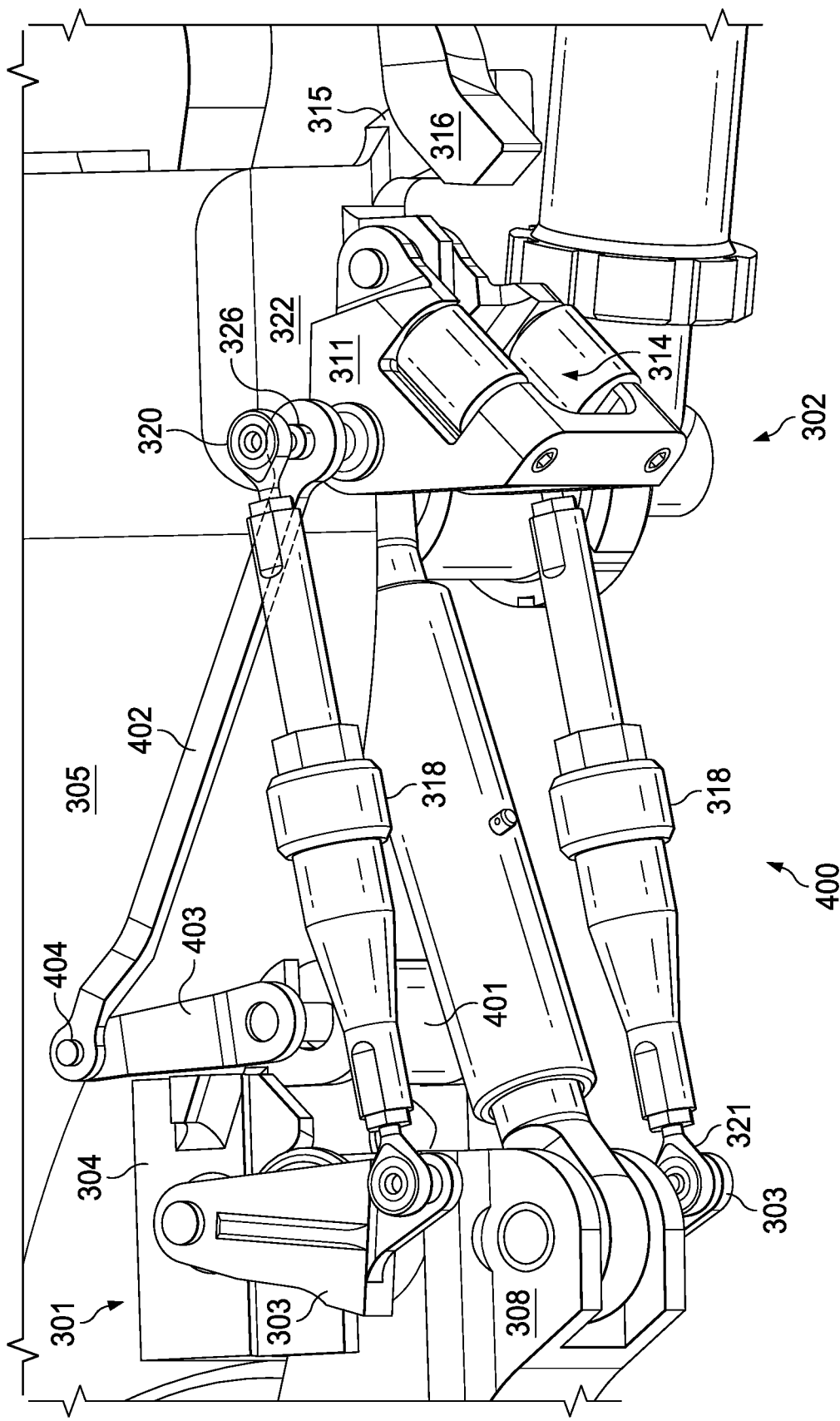
Figure 4B:
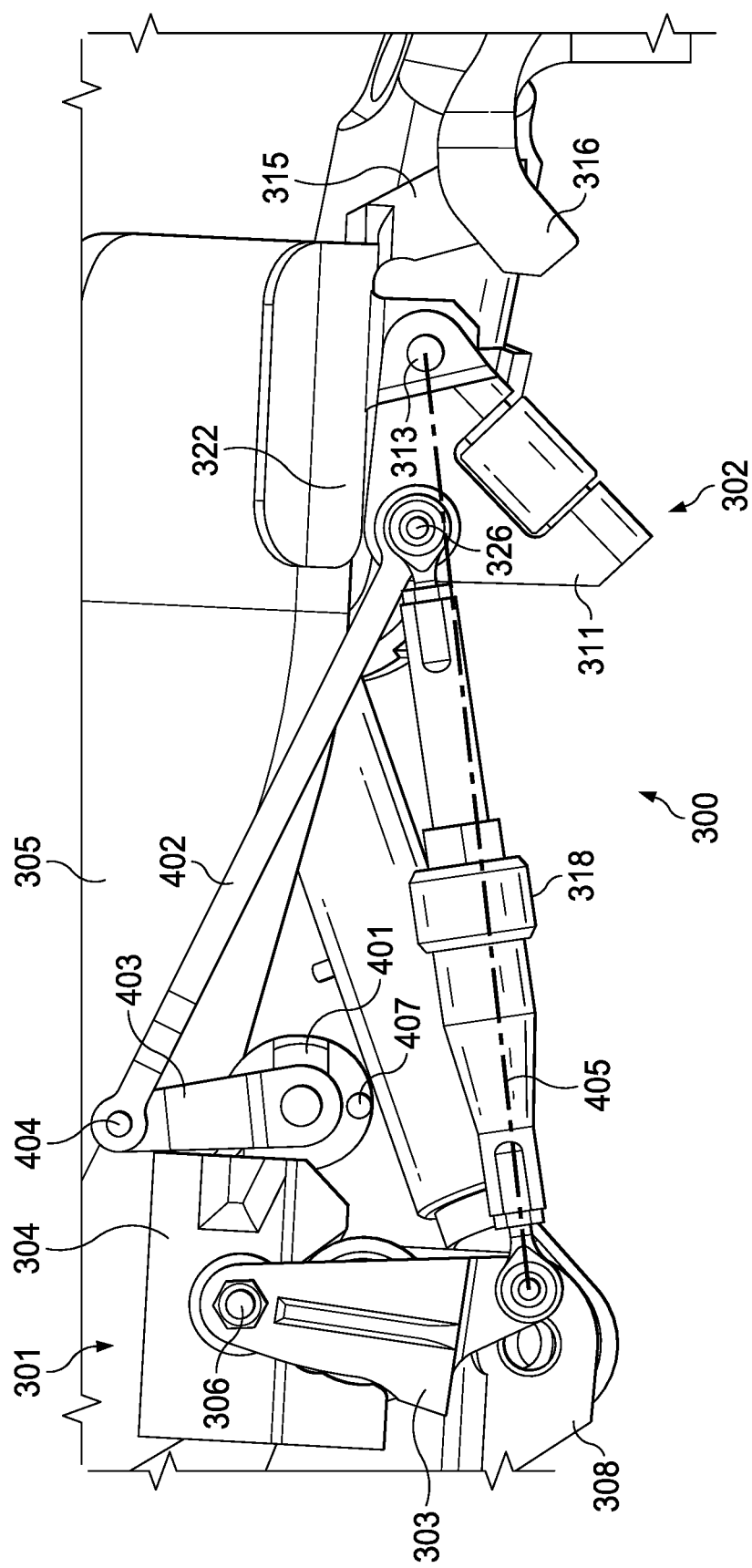
Figure 4C:
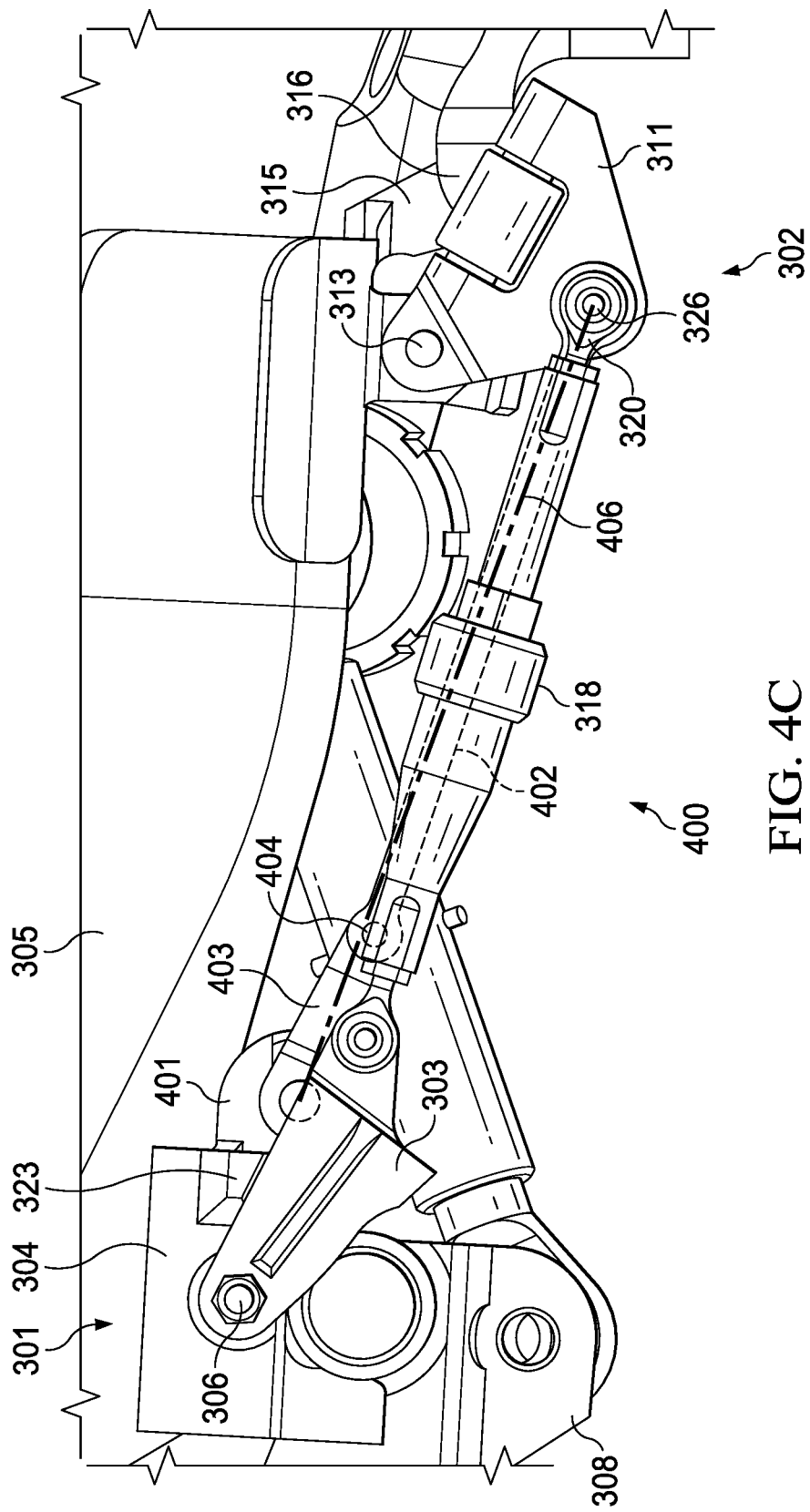

FIGS. 4A-4C illustrate an exemplary pitch-fold lock utilizing an actuator with an overslung crank arm.

Figure 5:
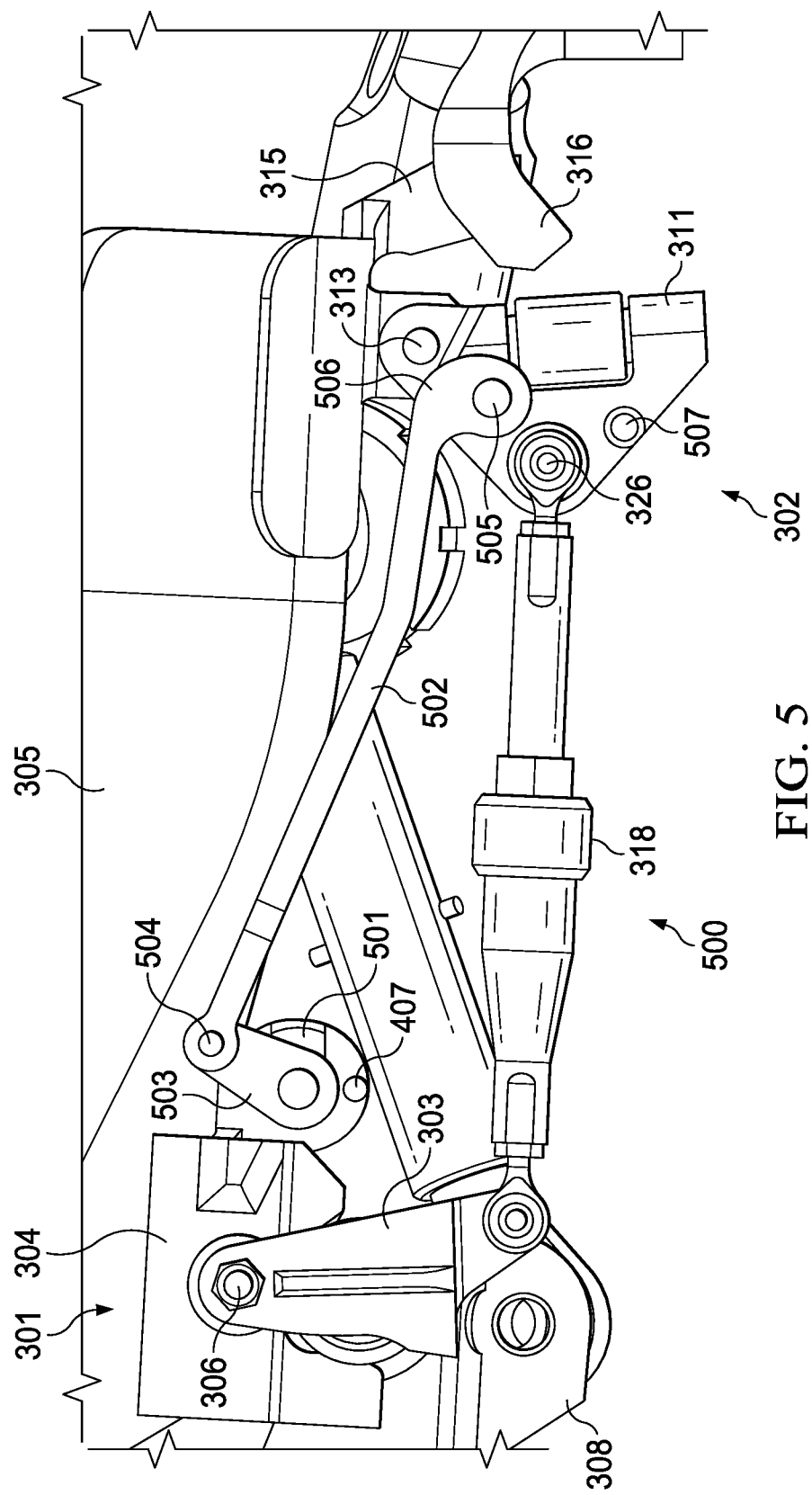

FIG. 5 illustrates an exemplary pitch-fold lock utilizing an actuator with an alternative overslung crank arm.

Figure 6A:
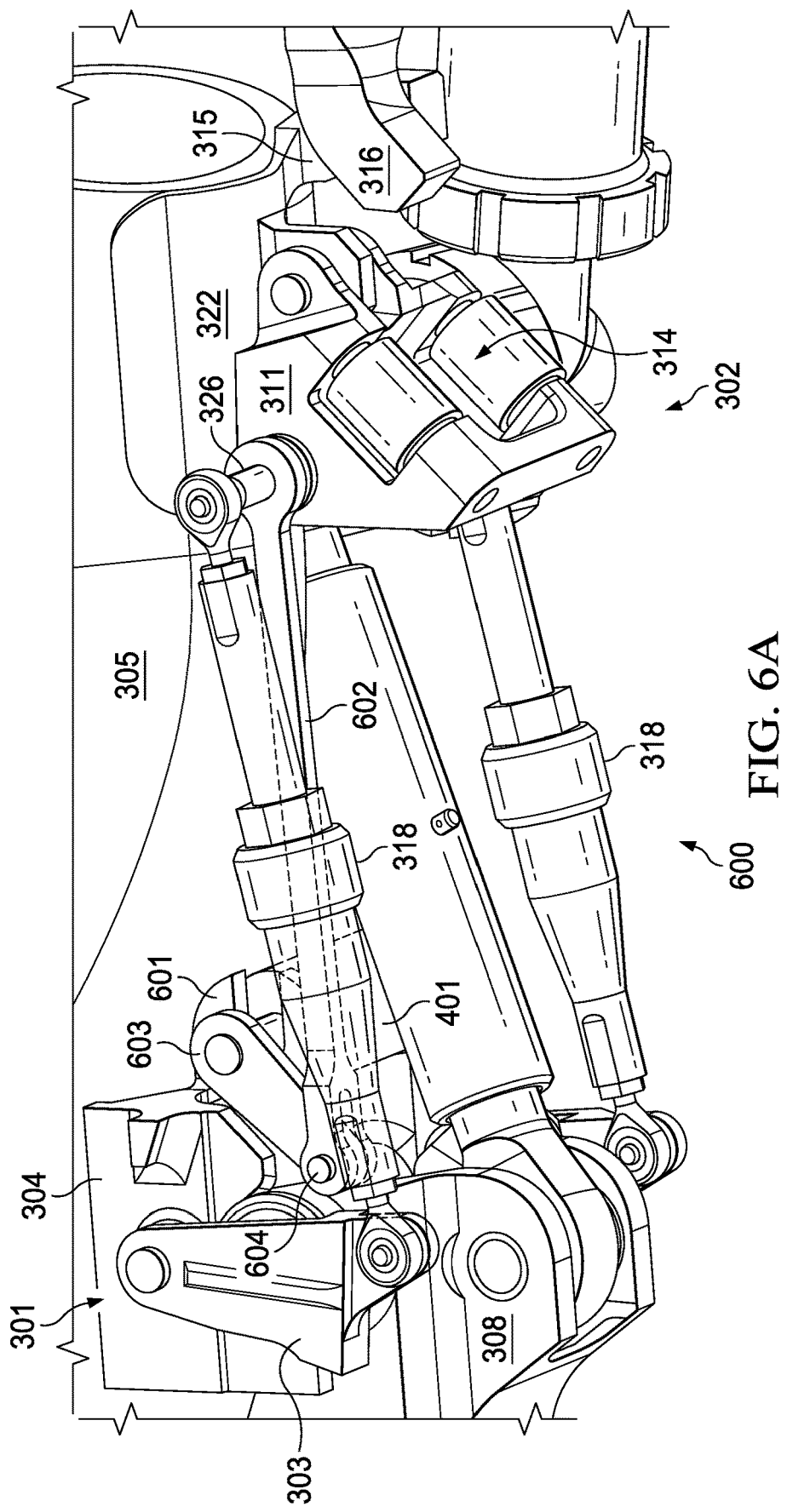
Figure 6B:
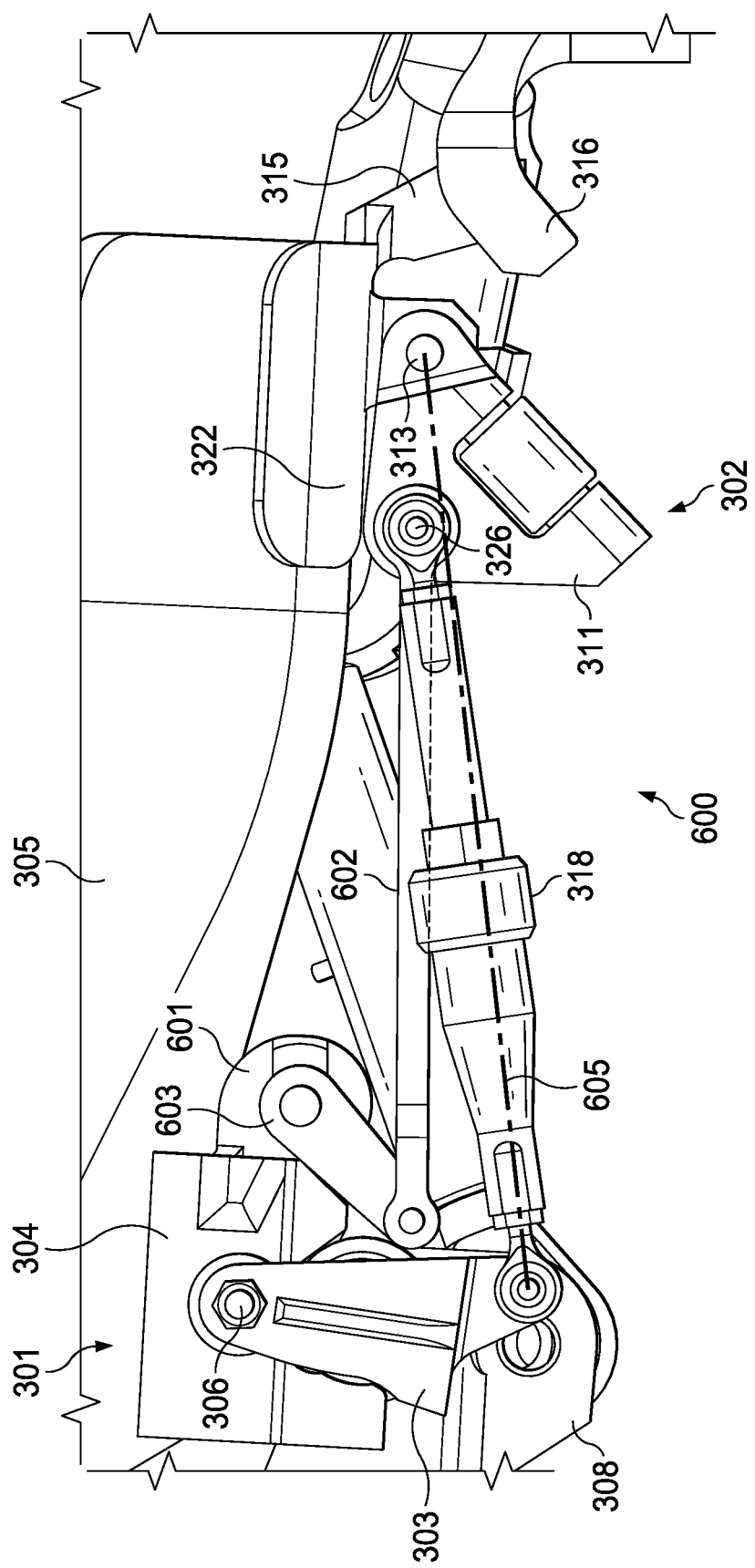
Figure 6C:
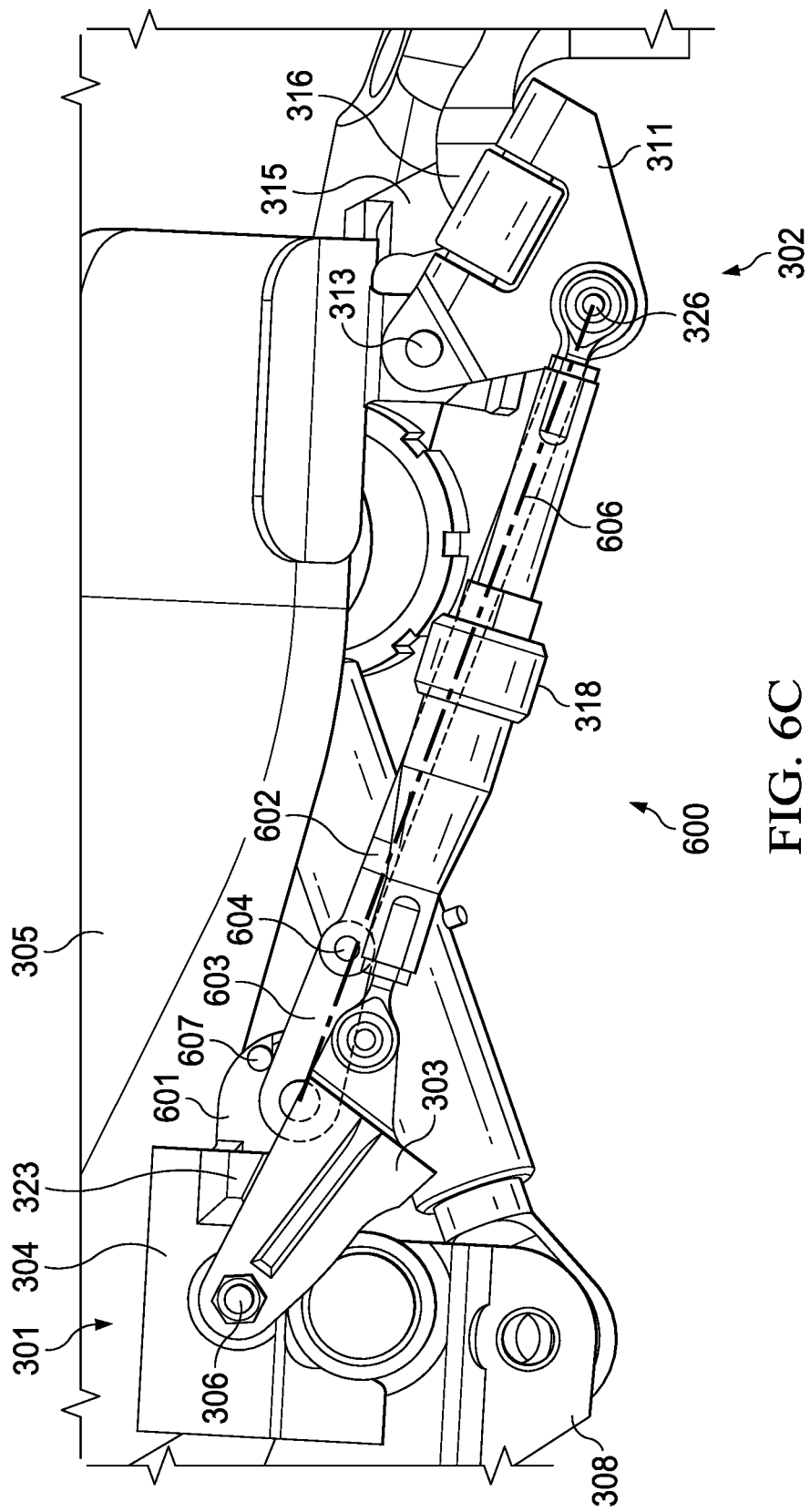

FIGS. 6A-6C illustrate an exemplary pitch-fold lock utilizing an actuator with an underslung crank arm.

Figure 7:
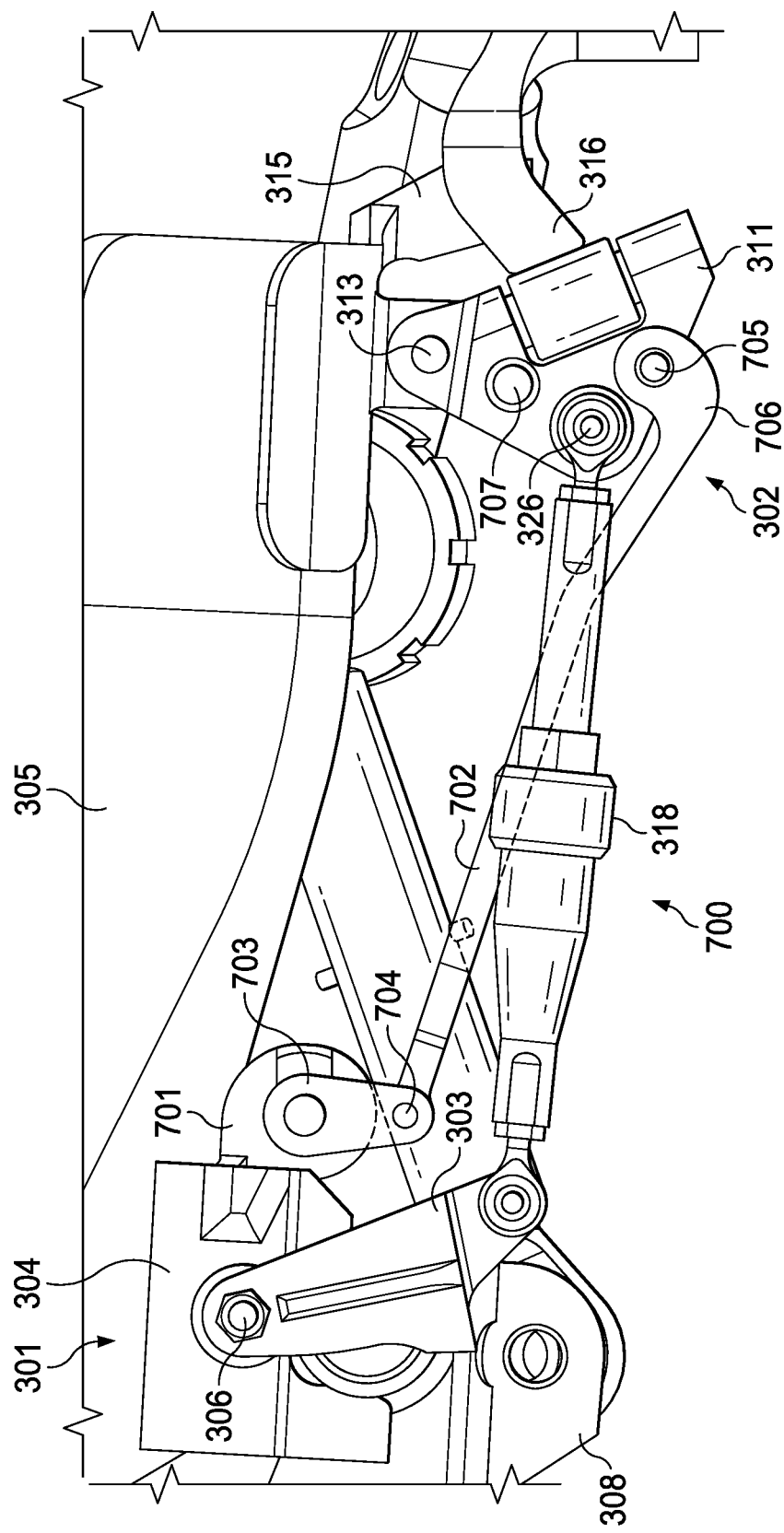

FIG. 7 illustrates an exemplary pitch-fold lock 700 utilizing an actuator with an alternative underslung crank arm.

Figure 8A:
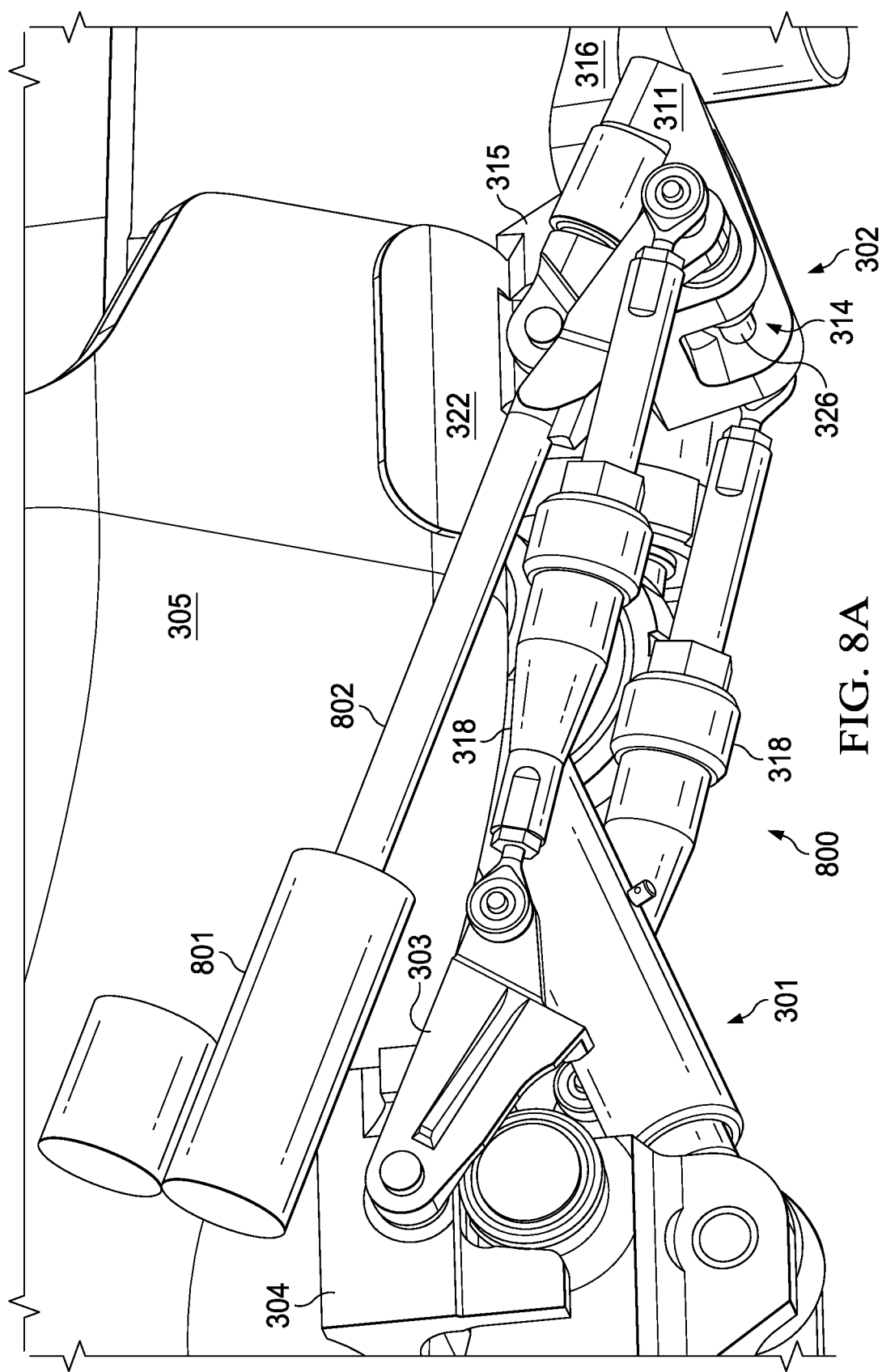
Figure 8B:
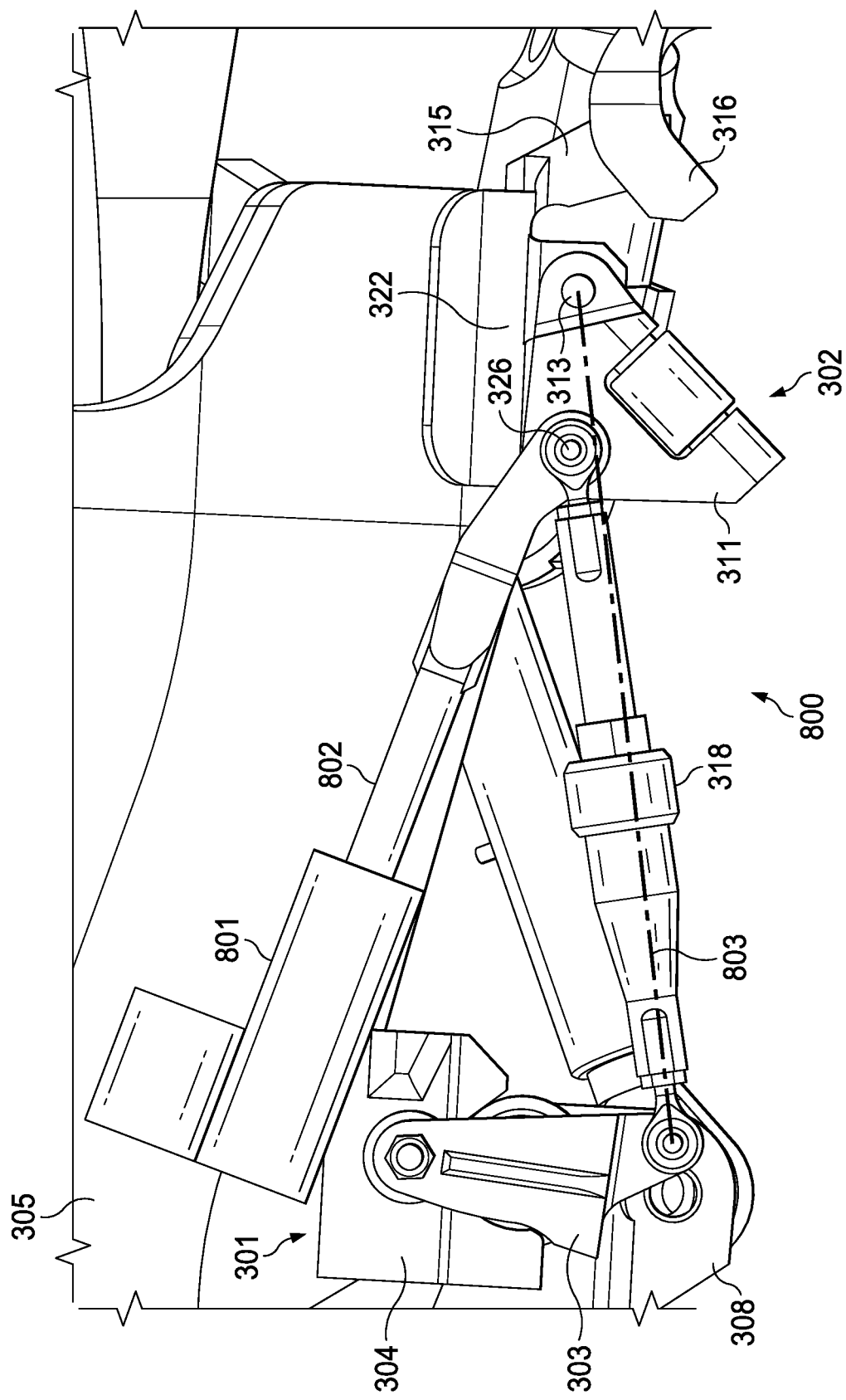
Figure 8C:
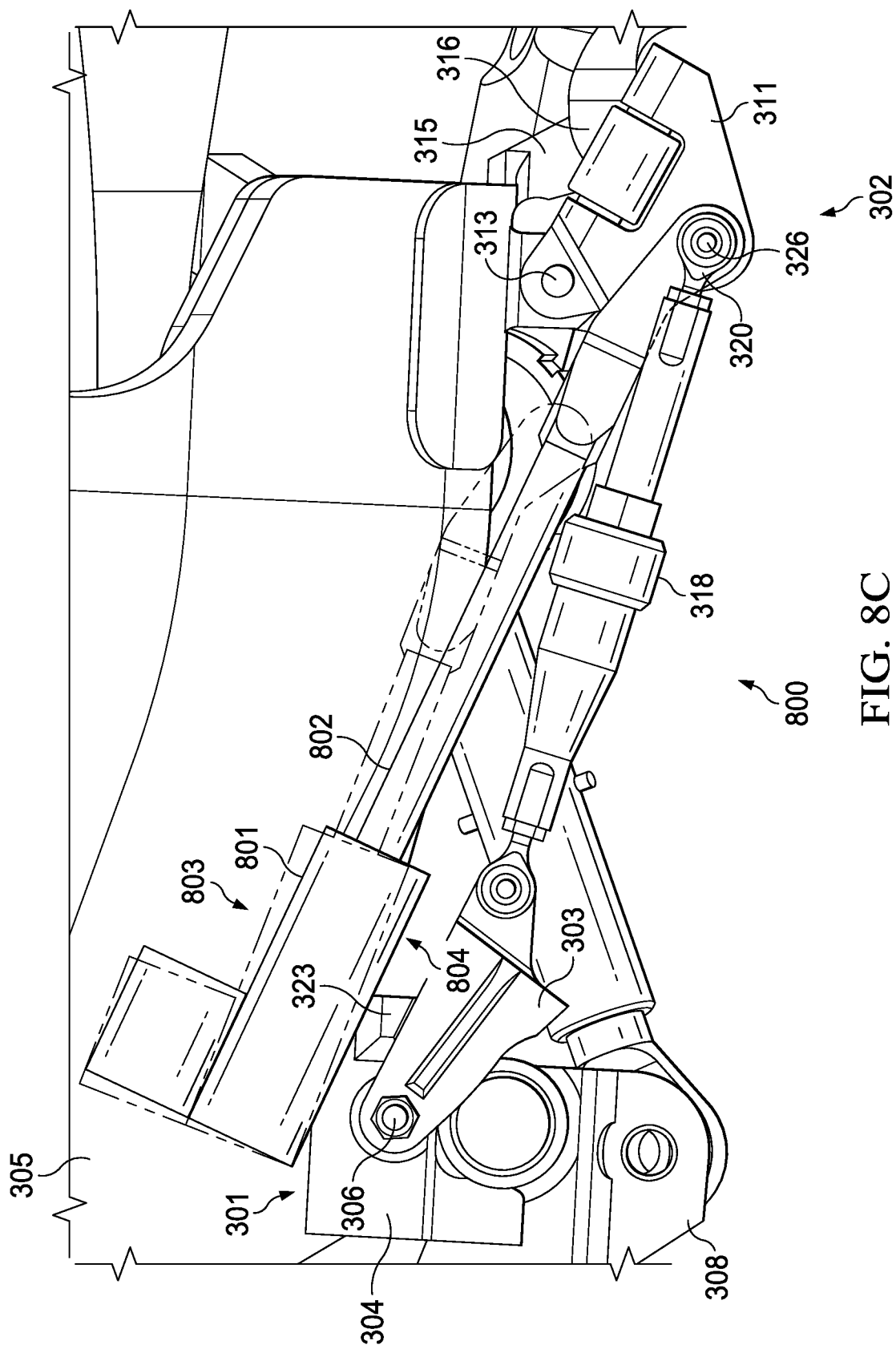

FIGS. 8A-8C illustrate an exemplary pitch-fold lock 800 utilizing a linear actuator.

Figure 9:
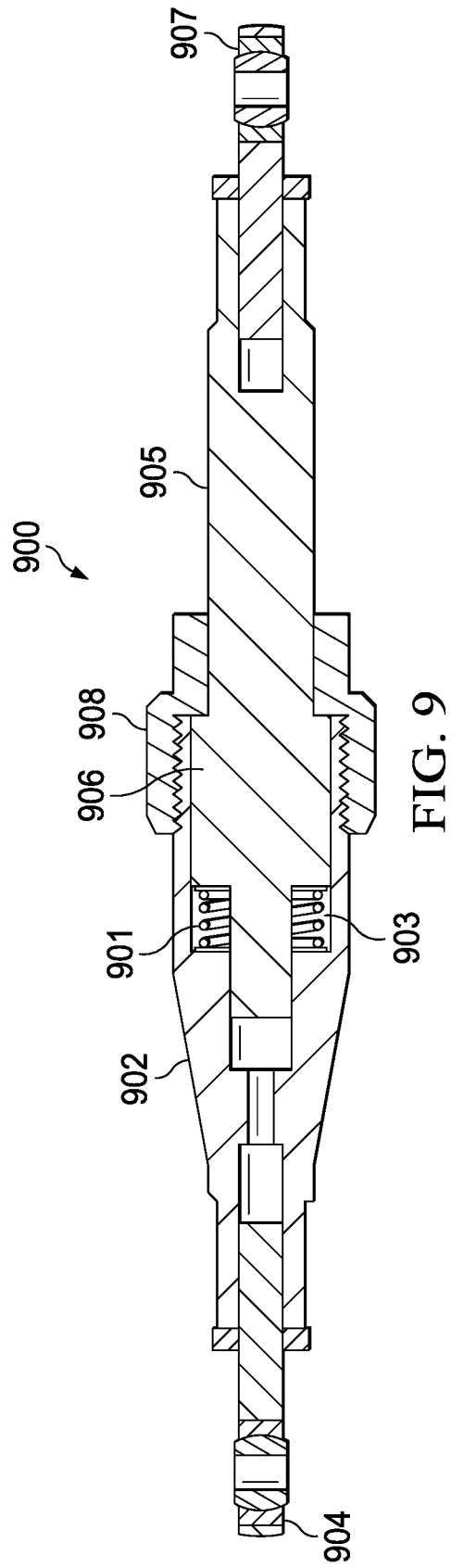

FIG. 9 is a cross-sectional view of an exemplary spring-loaded link.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C, a tiltrotor aircraft is schematically illustrated and generally designated 100. Tiltrotor aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight.

Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1C. Pylon assemblies 104a, 104b may comprise a fixed portion that is attached to wing 102 and a moveable portion that rotates or pivots relative to wing 102 as illustrated in FIG. 1A. In other embodiments, the entire pylon assembly 104a, 104b may rotate relative to wing 102.

Pylon assemblies 104a, 104b each house a portion of a drive system that is used to rotate proprotor assemblies 105a, 105b, respectively. The drive system may comprise, for example, a lift engine within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded. In other embodiments, pylon assemblies 104a, 104b may comprise engines that are configured to drive respective proprotor assemblies 105a, 105b.

FIG. 1A illustrates tiltrotor aircraft 100 in VTOL or helicopter flight mode, in which pylons 104a, 104b are configured in a vertical position and proprotor blades 106a, 106b rotate in a substantially horizontal plane to provide a lifting thrust, such that tiltrotor aircraft 100 flies much like a conventional helicopter.

FIG. 1B illustrates tiltrotor aircraft 100 in a forward flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that tiltrotor aircraft 100 flies much like a conventional propeller driven aircraft.

In the rotary flight modes, proprotor assemblies 105a, 105b rotate in opposite directions to provide torque balancing to tiltrotor aircraft 100. For example, when viewed from the front of tiltrotor aircraft 100 in proprotor forward flight mode (FIG. 1B) or from the top in helicopter mode (FIG. 1A), proprotor assembly 105a may rotate clockwise, for example, and proprotor assembly 105b may rotate counter-clockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that tiltrotor aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, tiltrotor aircraft 100 may transition between a proprotor-driven forward-flight mode and a thrust-driven forward-flight mode (referred to herein as "jet mode"). The thrust engine may be, for example, turbojet engines 107a, 107b that are mounted on fuselage 101. The thrust engine may be engaged to initially supplement the forward thrust of proprotor assemblies 105a, 105b. The lift engine may then be disengaged from proprotor assemblies 105a, 105b so that the thrust engines 107a, 107b provide all of the forward thrust for tiltrotor aircraft 100. The proprotor blades 106a, 106b on proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates tiltrotor aircraft 100 in airplane forward flight mode, in which proprotor blades 106a, 106b have been folded so that they are oriented substantially parallel to respective pylon assemblies 104a, 104b. This configuration minimizes the drag force generated by proprotor blades 106b, 106c during jet-mode flight. The forward cruising speed of tiltrotor aircraft 100 can be significantly higher in a thrust-driven airplane flight mode versus proprotor flight mode by reducing any airspeed-induced proprotor aeroelastic instability. In this configuration, the thrust engines 107a, 107b provide forward thrust for tiltrotor aircraft 100, thereby enabling wings 102 to provide a lifting force responsive to the forward airspeed. Apparatus for folding rotor blades on a stop-fold aircraft are disclosed, for example, in U.S. Pat. Nos. 8,998,125 B2, 10,336,447 B2, and 10,526,068 B2, the disclosures of which are hereby incorporated herein by reference in their entirety.

Tiltrotor aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the lift engine may again engage proprotor assemblies 105a, 105b. When torque power is applied to rotate proprotor blades 106a, 106b, tiltrotor aircraft 100 enters proprotor forward-flight mode. Tiltrotor aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

A flight control computer (FCC) may be incorporated into tiltrotor aircraft 100 and may be configured to control and communicate with various systems including, for example, proprotor blade control systems in proprotor assembly 105a, 105b. The proprotor blade control systems may be communicably coupled to the FCC and may provide closed-loop control of controllable elements located within the proprotor assemblies 105a, 105b. The controllable elements within the proprotor assemblies 105a, 105b may include any structural feature operable to move and/or effect change such as, for example, blade locks, a gimbal lock, trailing-edge flaps, twistable blades, independently controllable elements attached or connected to blades, combinations of the foregoing and/or the like.

The proprotor blade control systems may include, for example, actuators that control motion of the controllable elements in the proprotor assemblies 105a, 105b, sensors that provide position feedback data related to the controllable elements, and control computers that operate the actuators, for example, by transmitting control signals to the actuators. The FCC and the proprotor blade control systems may collaboratively provide a variety of redundant control methods relative to the controllable elements in the proprotor assemblies 105a, 105b.

Although tiltrotor aircraft 100 has been described as having an internal lift engine and separate external thrust engines 107a, 107b, wherein the lift engine may operate both of the proprotor assemblies in rotary flight mode, it should be understood by those having ordinary skill in the art that other engine arrangements are possible and are considered to be within the scope of the present disclosure. For example, in an alternative embodiment, tiltrotor aircraft 100 may have multiple lift engines that provide torque and rotational energy separately to proprotor assemblies 105a, 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations. In other embodiments, the thrust engines 107a, 107b may be located inside fuselage 101 or on wings 102. In further embodiments, the same engine(s) may provide both lifting and thrust power, such as an engine with turboshaft, turbofan, and/or turboprop capabilities.

FIGS. 2A-2D illustrate an exemplary mechanism 200 for transitioning a tiltrotor aircraft between rotary and non-rotary flight modes. A rotor assembly 201 is depicted as a gimbal mounted, three bladed rotor assembly having a gimballing degree of freedom relative to a mast 202. Rotor assembly 201 includes a rotor hub 203 that is coupled to and operable to rotate with mast 202. Rotor hub 203 includes three arms 204 each of which support a blade assembly 205 (only one blade assembly shown to simplify the figures). Each blade assembly 205 includes a cuff 206 and a rotor blade 207 that is pivotably coupled to cuff 206 by a connection member depicted as pin 208. As discussed herein, blade assembly 205 has a pitching degree of freedom during rotary flight and a folding degree of freedom during non-rotary flight.

The pitching and folding degrees of freedom of blade assembly 205 are realized using swash plate 209. Swash plate 209 includes a non-rotating lower swash plate element 210 and a rotating upper swash plate element 211. Swash plate element 211 is operably coupled to each blade assembly 205 at cuff 206 via a pitch link 212 and a pitch horn 213 (only one pitch link shown to simplify the figures). A control system including swash plate actuators (not shown) is coupled to swash plate element 210. The control system operates responsive to pilot inputs to raise, lower, and tilt swash plate element 210 and thereby move swash plate element 211 relative to mast 202. These movements of swash plate 209 collectively and cyclically control the pitch of blade assemblies 205 during rotary flight and fold rotor blade assemblies 205 during non-rotary flight.

Figure 2A:
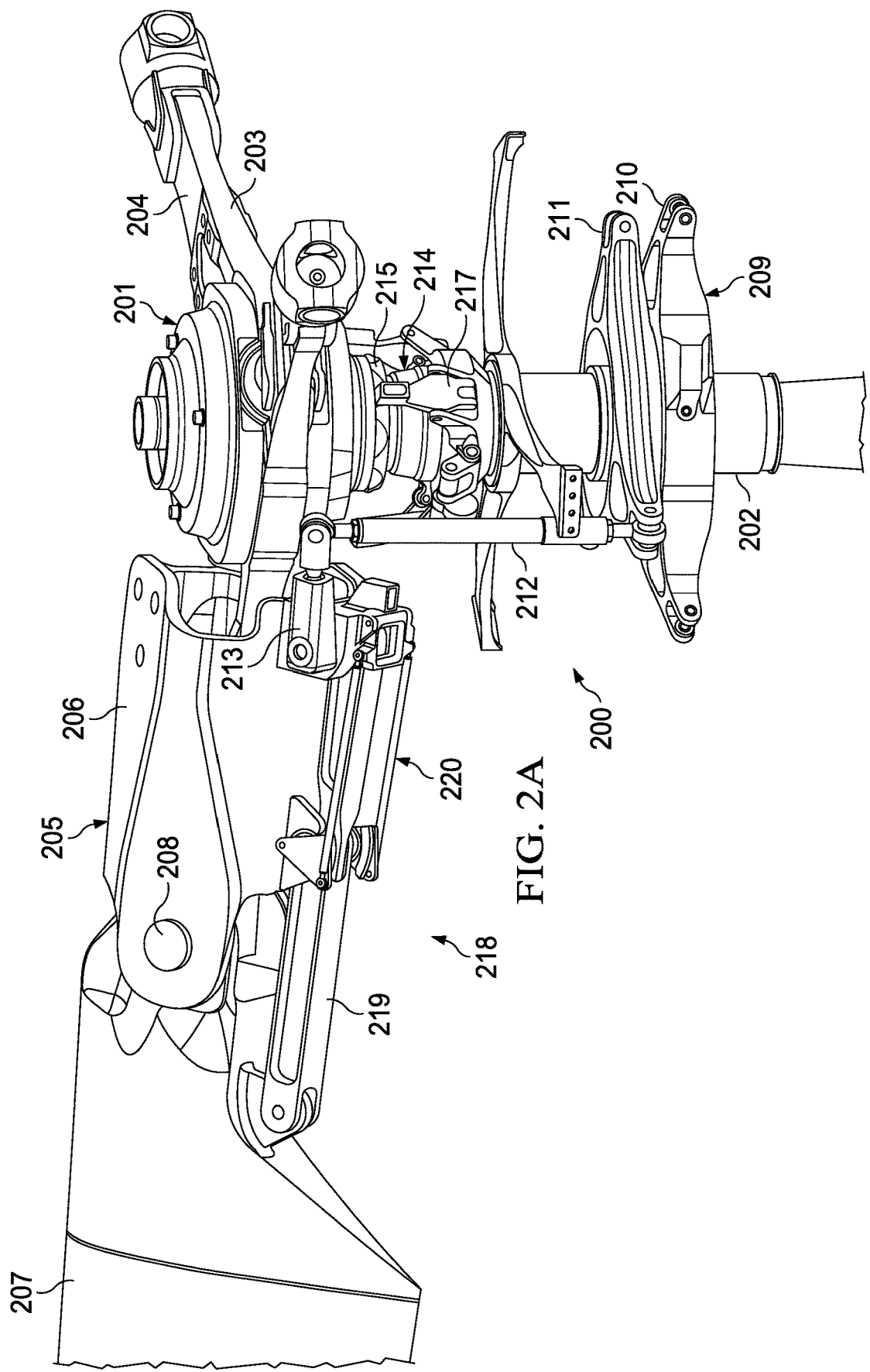
Figure 2B:
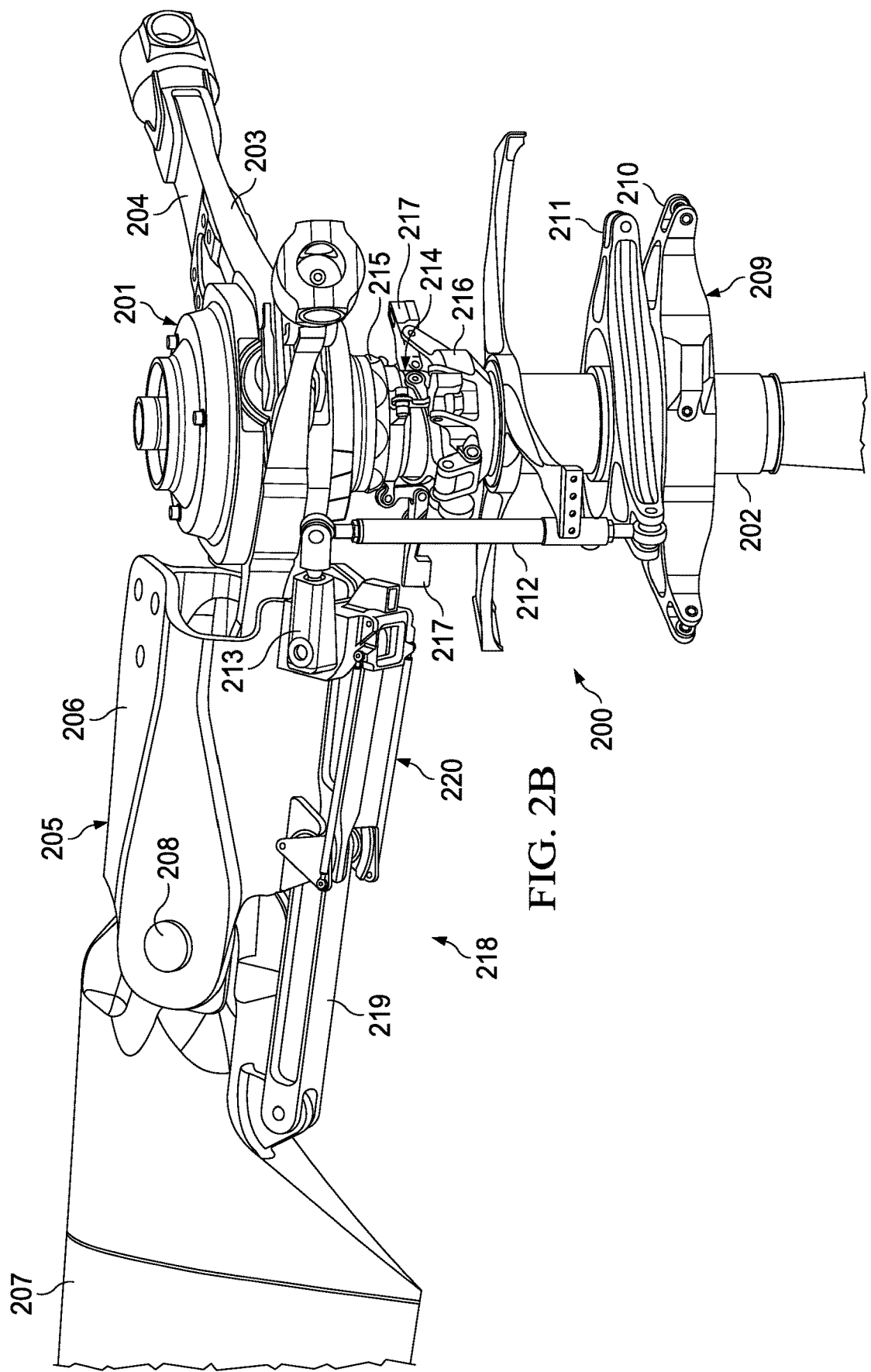

Transitioning mechanism 200 includes a gimbal lock 214 that is coupled to and operable to rotate with mast 202. Gimbal lock 214 is operable to selectively enable and disable the gimballing degree of freedom of rotor assembly 201 relative to mast 202. As shown in FIG. 2A, gimbal lock 214 is disengaged from rotor assembly 201, which enables the gimballing degree of freedom of rotor assembly 201. In this configuration, there is an axial separation between gimbal lock 214 and rotor hub 203 such that any teetering or flapping motion of rotor assembly 201 is not impacted by gimbal lock 214. When it is desired to transition the tiltrotor aircraft from the rotary flight mode and the non-rotary flight mode, gimbal lock 214 is operated to raise into a conical receptacle 215 of rotor hub 203. In this configuration, as best seen in FIG. 2B, gimbal lock 214 is engaged with conical receptacle 215 extending from a lower portion of hub 203, which disables the gimballing degree of freedom of rotor assembly 201 relative to mast 202 for non-rotary flight.

Transitioning mechanism 200 also includes a blade-stop assembly 216 (FIG. 2C) that is coupled to and operable to rotate with mast 202. Blade-stop assembly 216 includes three arms 217 that correspond to the three blade assemblies 205 of rotor assembly 201. In the illustrated embodiment, blade-stop assembly 216 is integrated with gimbal lock 214, such that operation of blade-stop assembly 216 occurs together with the operation of gimbal lock 214. It should be appreciated, however, that a blade-stop assembly and a gimbal lock for use with the embodiments disclosed herein could alternatively operate independent of one another. Arms 217 of blade-stop assembly 216 have a radially contracted orientation, which provides clearance for rotor blade assemblies 205 during rotary flight. When it is desired to transition the tiltrotor aircraft from the rotary flight mode to the non-rotary flight mode, arms 217 are shifted from the radially contracted orientation (FIG. 2A) to a radially extended orientation (FIG. 2C). In this configuration, arms 217 of blade-stop assembly 216 will each engage a cuff 206 of a blade assembly 205 upon feathering the blade assemblies 205 responsive to lowering swash plate 209 as shown in FIG. 2C. In this manner, blade-stop assembly 216 and arms 217 provide a positive stop for rotor blade assemblies 205 in the configuration position.

Figure 2D:
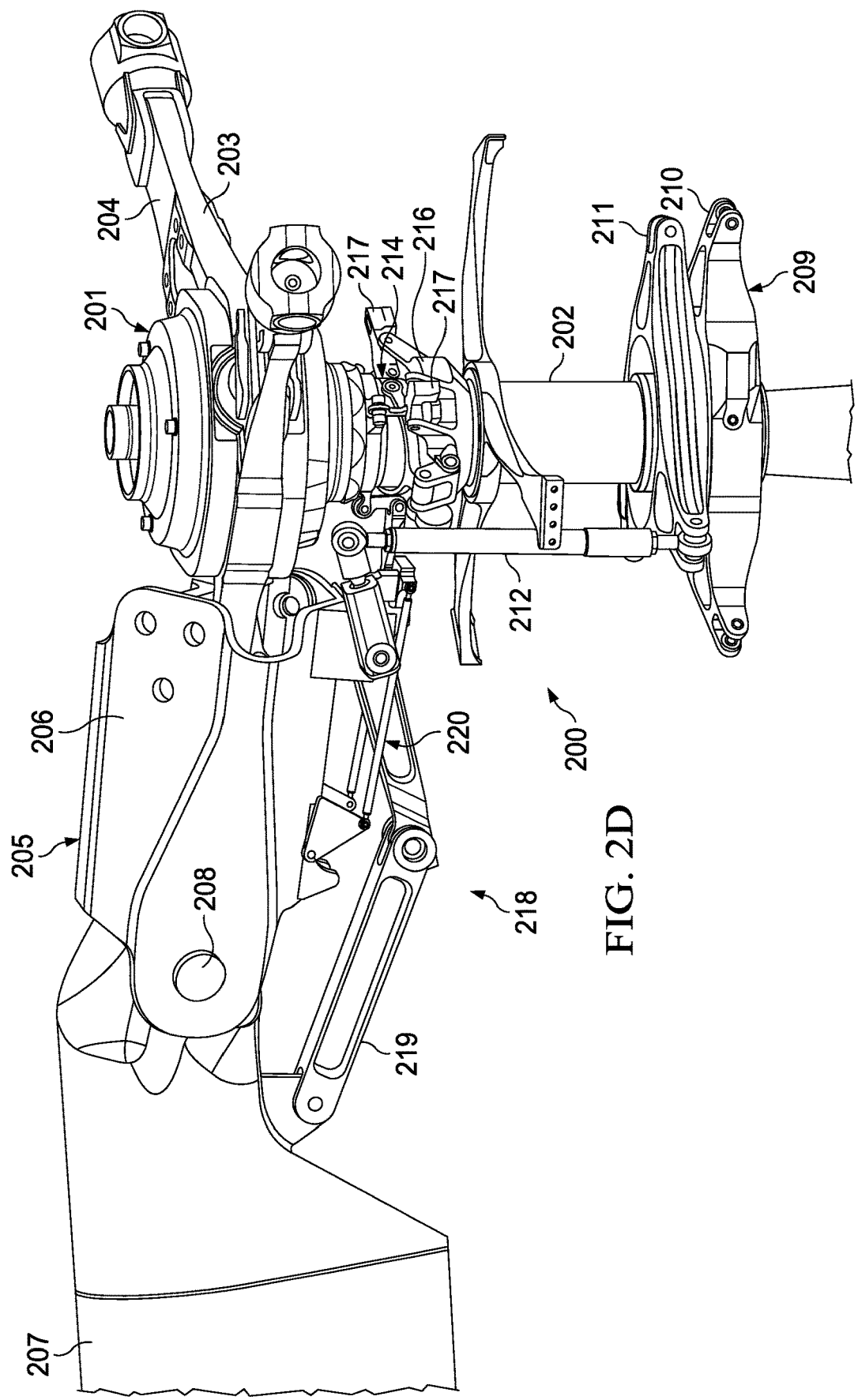

Each blade assembly 205 comprises a blade-lock assembly 218 that is selectively operable to enable or disable the folding degree of freedom and the pitching degree of freedom for the respective rotor blade 207. Each blade-lock assembly 218 further includes a blade-fold link 219 and a pitch-fold lock 220 that has a fold-lock position (FIG. 2C) in which blade-fold link 219 is secured to cuff 206 and a pitch-lock position (FIG. 2D) in which cuff 206 is secured to arm 217 of blade-stop assembly 216. In the fold-lock position, pitch-fold lock 220 keeps blade-lock assembly 218 in the extended configuration shown in FIG. 2C thereby preventing rotor blade 207 from folding; however, cuff 206 is not locked and, therefore, the pitch of rotor blade 207 may be adjusted. In the pitch-lock position, pitch-fold lock 220 allows blade-fold link 219 to collapse or fold as shown in FIG. 2D thereby allowing rotor blade 207 to fold; however, in this configuration cuff 206 is locked to blade-stop assembly 216 thereby locking the pitch of rotor blade 207 so that rotor blade 207 maintains the feathered configuration while folding.

It should be appreciated, however, that the exact mating geometry of conical ring 132 and receptacle 108 is implementation specific and not limited to the illustrated geometry. Example gimbal locking devices for blade-fold aircraft are disclosed, for example, in U.S. patent application Ser. No. 16/804,357, filed Feb. 28, 2020, and in U.S. patent application Ser. No. 16/599,483, filed Oct. 11, 2019, the disclosures of which are hereby incorporated herein by reference in their entirety.

FIGS. 3A-3C illustrate an exemplary pitch-fold lock 300 utilizing a low-profile crank actuator 319 to move between a fold-locked position (FIG. 3B) and a pitch-locked position (FIG. 3C). Pitch-fold lock 300 includes a fold lock 301 and a pitch lock 302. Each fold lock 301 consists of a pair of arms 303, e.g. levers, that are rotatably coupled to respective anchors 304 of cuff 305 via connection members depicted as pins 306. Flanges 307 on blade-fold link 308 are adapted to fit within notches 309 in anchors 304. When a flange 307 is positioned within notch 309, the fold lock 301 may either allow or prevent blade-fold link 308 from moving depending upon the positioning of arm 303. In the fold-locked position (FIG. 3B), a bearing portion 310 of arm 303 contacts flange 309 and locks blade-fold link 308 in an extended position, which maintains the respective rotor blade in an extended position. When fold lock 301 is in the unlocked position (FIG. 3C), arm 303 is rotated away from notch 309 so that flange 307 is free to move away from anchor 304, thereby allowing blade-fold link 308 to fold, which causes the respective rotor blade to fold.

Pitch lock 302 includes a hasp 311 that is rotatably coupled to a lug 312 of cuff 305 via a connection member depicted as pin 313. Hasp 311 includes a central opening 314 that is operable to selectively receive and retain a tab 315 on cuff 315 and a tab 316 on a blade-stop assembly. Elastomeric rollers 317 may be included on hasp 311 to ensure that cuff tab 315 and blade-stop tab 316 are smoothly inserted into opening 314. In the fold-locked position (FIG. 3B), cuff tab 315 and blade-stop tab 316 are free of hasp 311 and, therefore, tabs 315 and 316 may move relative to each other. This means that cuff 305 may rotate (e.g., due to changes in rotor blade pitch) when pitch-lock 302 and hasp 311 are in the fold-locked position (FIG. 3B). When pitch lock 302 is in the locked position (FIG. 3C), hasp 311 is rotated toward and over cuff tab 315 and blade-stop tab 316, which secures tabs 315 and 316 together within central opening 314. This prevents cuff tab 315 (and, therefore, cuff 305) from rotating away from blade-stop tab 316 thereby locking the pitch of the rotor blade in a feathered configuration. It will be understood that the location of cuff tab 315 may be set at any radial position around cuff 305 so that the rotor blade may be locked in a feathered configuration or in any desired rotor blade pitch. This allows the rotor blade to be folded in any desired degree of pitch that is appropriate for a particular rotor design.

Fold lock 301 and pitch lock 302 are coupled together by a pair of spring-loaded links 318 such that a single low profile actuator 319 that is operable to shift pitch-fold lock 300 between the fold-lock position and the pitch-lock position. In one embodiment, actuator 319 is a compact (i.e., flat) rotary actuator with a wide motor configuration that allows for a low-profile package that is aerodynamically streamlined. Pitch-fold lock 300 uses geometry and spring force to mechanically secure fold lock 301 in the fold-lock position for rotary flight. In a traditional blade-lock assembly, an electric motor, such as actuator 319, provides continuous force on hasp 311 and a rigid link to maintain arm 303 in the fold-lock position. Pitch-fold lock 300 provides a passive locking force to maintain fold lock 301 in the fold-lock position without requiring a secondary locking force.

Each spring-loaded link 318 is pivotally connected at a first end 320 to hasp 311 and pivotally connected at a second end 321 to arm 303 of fold lock 301. Hasp 311 serves as a bellcrank that pivots about connection member 313. When hasp 311 is rotated about connection member 313 to the position contacting hard stop 322 on cuff 305 (FIG. 3B), spring-loaded link 318 is compressed in an overcenter configuration. Structure 322 is the base/pivot point for hasp 311 and may also have a physical stop integrated to arrest rotation of hasp 311. An adjustment screw (not shown) may be incorporated into hasp 311 to change when hasp 311 contacts the stop portion of structure 322. The compressed spring-loaded link 318 provides a spring force holding arm 303 in the fold-lock position and resisting a counterforce urging arm 303 to an unlocked position. In this overcenter position, spring-loaded link 318 and hasp 311 resist a counter-force that pushes on arm 303 and resists backdriving pitch-fold lock 300 out of the fold-lock position of FIG. 3B. The amount of overcenter interference limits the deflection that can occur before arm 303 is allowed to move out of the locked position. Thus, if pitch-fold lock 300 deflects or compresses more than the overcenter interference then arm 303 can move out of the lock position. Arm 303 may rotate to a position contacting stop 323 on anchor 304 at which point flange 307 may move from notch 309 to allow folding or partial folding of the rotor blade. FIG. 3C shows spring-loaded link 318 in a below-center position with pitch-fold lock 300 out of the fold-lock position thereby enabling a folding degree of freedom of the rotor blade assembly and with hasp 311 in the pitch-lock position thereby disabling a pitching degree of freedom of the rotor blade assembly.

The embodiment illustrated in FIGS. 3A-3C shows a pitch-fold lock 300 that uses rotary actuator 319 and actuation linkage 324 to actuate the mechanism. Actuation linkage 324 is attached to rotary actuator 319 using actuator arm 325. Activation linkage 324 pivots relative to actuator arm 325 at pin 326. As actuator 319 rotates counterclockwise or clockwise, actuator arm 325 moves actuation linkage 324 toward or away from blade-stop tab 316, respectively. Actuation linkage 324 is attached to hasp 311 at connecting pin 327, which also connects hasp 311 to spring-loaded link 318.

Pitch-fold lock 300 utilizes passive overcenter locking for both directions of pitch and fold locking. As a result, even if actuator 319 fails in either locked position, the system will remain locked. Axis 328 (FIG. 3B) illustrates the top dead center position of overcentering fold-lock 301 and the position of spring-loaded link 318 when arm 303 is in the fold-lock position. When hasp 311 is rotated about connection member 313 to the position contacting hard stop 322, spring-loaded link 318 is located above overcenter position 328. When the fold lock 301 is engaged, arm 303 is held in the locked position by spring-loaded link 318 and any force in the fold-unlock direction is resisted by contact between hasp 311 and stop 322. Axis 329 (FIG. 3C) illustrates the top dead center position of overcentering pitch-lock 302 and the position of actuation linkage 324 when hasp 311 is in the pitch-lock position. When arm 303 is rotated about connection member 306 to the position contacting hard stop 323, actuation linkage 324 is located above overcenter position 329. When the pitch lock 302 is engaged, hasp 311 is held in the locked position by actuation linkage 324 and any force in the pitch-unlock direction is resisted by contact between actuator arm 325 and stop 330 or by actuator 319 reaching the limit of its counterclockwise rotation.

The overcenter features provided in pitch-fold lock 300 reduce the criticality of actuator 319. The actuator 319 can fail in either the pitch-lock position or the fold-lock position, such as due to a failure of the motor or the associated control electronics, and the pitch-fold lock 300 will passively hold the rotor blade in the failed position. This would then allow the aircraft to safely land in the failed rotor blade configuration.

Prior solutions placed the actuator at the rotational axis of pin 313 on hasp 311. The mechanism provided in pitch-fold lock 300 utilizes geometry that reduces the overall torque requirements for rotary actuator 319 when compared to prior solutions. Additionally, the configuration shown in FIGS. 3A-3C provides more room for actuator 319, which allows for a larger actuator 319. The ability to move a low-profile crank actuator 319 away from hasp 311 also provides more flexibility for mounting positions compared to prior solutions.

Actuator 319 may be controlled by the FCC or other system in response to pilot inputs or autopilot commands. For example, in one embodiment, a rotor control computer (RCC) controls actuator 319 as commanded by the FCC. In other embodiments, precision angular position sensors may be used at strategic pivot points to monitor the position of the pitch-fold lock mechanism 300 at all times and not just at the end points. The position information may also be used for monitoring purposes by the RCC and FCC. Such position information may be used by the FCC or RCC to control the speed and force of the actuator relative to position during the entire stroke. Actuator 319 and/or the FCC or RCC may receive positional feedback using sensors at stops 322, 323, and/or 330, for example. When hasp 311 contacts stop 322, a contact sensor may signal actuator 319 and/or the FCC that the fold lock is engaged. When arm 303 contacts stop 323 or when arm 325 contacts stop 330, a contact sensor may signal actuator 319 and/or the FCC that the pitch lock is engaged. Once the stops have been contacted at either end, the actuator will snub in the structure with a predefined and limited force before the actuator is disabled. Both contact sensors and angular sensors may be used, or the system may use just one sensor type. The angular sensors allow for position monitoring at all times, which may be preferred in some embodiments.

FIGS. 4A-4C illustrate an exemplary pitch-fold lock 400 utilizing an actuator with an overslung crank arm to move between a fold-locked position and a pitch-locked position. Elements of pitch-fold lock assembly 400 that are common to pitch-fold lock 300 and other example embodiments use similar element labels in the drawings.

The embodiment illustrated in FIGS. 4A-4C shows a pitch-fold lock 400 that uses rotary actuator 401 and overslung crank linkage 402 to actuate the mechanism. Overslung crank linkage 402 is coupled to rotary actuator 401 by actuator arm 403. Overslung crank linkage 402 and actuator arm 403 rotate relative to each other at connector pin 404. As actuator 401 rotates clockwise or counterclockwise, actuator arm 403 moves overslung crank linkage 402 toward or away from blade-stop tab 316, respectively. Overslung crank linkage 402 is attached to hasp 311 at connecting pin 326, which also connects hasp 311 to spring-loaded link 318.

Pitch-fold lock 400 utilizes passive overcenter locking for both directions of pitch and fold locking. Axis 405 (FIG. 4B) illustrates the top dead center position of overcentering fold-lock 301 and the position of spring-loaded link 318 when arm 303 is in the fold-lock position. When hasp 311 is rotated about connection member 313 to the position contacting hard stop 322, spring-loaded link 318 is located above overcenter position 405. When the fold lock 301 is engaged, arm 303 is held in the locked position by spring-loaded link 318 and any force in the fold-unlock direction is resisted by contact between hasp 311 and stop 322. Axis 406 (FIG. 4C) illustrates the top dead center position of overcentering pitch-lock 302 and the position of overslung crank linkage 402 and actuator arm 403 when hasp 311 is in the pitch-lock position. When arm 303 is rotated about connection member 306 to the position contacting hard stop 323, pin 404 between overslung crank linkage 402 and actuator arm 403 is dropped below the overcenter position 406. When the pitch lock 302 is engaged, hasp 311 is held in the locked position by overslung crank linkage 402 and any force in the pitch-unlock direction is resisted by contact between actuator arm 403 and stop 407 or by actuator 401 reaching the limit of its clockwise rotation.

The overcenter features provided in pitch-fold lock 400 reduce the criticality of actuator 401. The actuator 401 can fail in either the pitch-lock position or the fold-lock position, and the pitch-fold lock 400 will passively hold the rotor blade in the failed position to allow safe operation of the aircraft.

As noted above, prior solutions placed the actuator at the rotational axis of pin 313 on hasp 311. The mechanism provided in pitch-fold lock 400 utilizes geometry that reduces the overall torque requirements for rotary actuator 401 when compared to prior solutions. The configuration shown in FIGS. 4A-4C allows the actuator 401 to be moved away from pitch-lock 302. Actuator 401 in pitch-fold lock 400 may be positioned outward on cuff 305 compared to some other embodiments, which may provide more space for rotary actuator placement. As best illustrated in FIG. 4A, actuator 401 may be placed under cuff 305 and the shape of actuator arm 403 may have a bent or curved shape that keeps it close to cuff 305 to minimize interference with other rotor components. The positioning of actuator 401 under cuff 305 and the use of a streamlined actuator arm 403 may also reduce the components' exposure to the airstream, which would lower drag forces.

Actuator 401 may be controlled by the FCC or other system in response to pilot inputs or autopilot commands. Actuator 401 and/or the FCC may receive positional feedback using sensors at stops 322, 323, and/or 407, for example. When hasp 311 contacts stop 322, a contact sensor may signal actuator 401 and/or the FCC that the fold lock is engaged. When arm 303 contacts stop 323 or when arm 403 contacts stop 407, a contact sensor may signal actuator 401 and/or the FCC that the pitch lock is engaged. Alternatively, precision angular position sensors at strategic pivot points may be used to monitor the position of the pitch-fold lock mechanism 400 at all times. The position information may be used by the RCC and FCC, such as to control the speed and force of the actuator relative to position during the entire stroke.

FIG. 5 illustrates an exemplary pitch-fold lock 500 utilizing an actuator with an alternative overslung crank arm to move between a fold-locked position and a pitch-locked position. Pitch-fold lock 500 that uses rotary actuator 501 located under cuff 305 and modified overslung crank linkage 502 to actuate the mechanism. Overslung crank linkage 502 is coupled to rotary actuator 501 by actuator arm 503. Overslung crank linkage 502 and actuator arm 503 rotate relative to each other at connector pin 504. As actuator 501 rotates clockwise or counterclockwise, actuator arm 503 moves overslung crank linkage 502 toward or away from blade-stop tab 316, respectively. Actuation linkage 502 is coupled to hasp 311 at attachment pin 505.

Compared to the embodiment illustrated in FIGS. 4A-4C, pitch-fold lock 500 uses a shorter actuator arm 503, a different shaped overslung crank linkage 502, and a different hasp attachment point 505. This configuration allows overslung crank linkage 502 to remain closer to cuff 305 in both the pitch-lock and fold-lock positions, which minimizes exposure to the airstream and other rotor components. Overslung crank linkage 502 has an offset connector end 506 that coupled to upper attachment pin 505. This offset connector 506 allows linkage 502 to avoid connector pin 326 and linkage 318 through the full range of movement of hasp 311. However, like the prior designs, pitch-fold lock 500 still provides passive overcenter locking for both directions of pitch and fold locking. The actuator 501 can fail in either the pitch-lock position or the fold-lock position, and the pitch-fold lock 500 will passively hold the rotor blade in the failed position to allow safe operation of the aircraft.

In an alternative embodiment, overslung crank linkage 502 may be coupled to lower attachment pin 507 on hasp 311, which may require modification to attachment end 506, such as having an upward curve instead of the downward curve as illustrated. Additional bends in overslung crank linkage 502 may also be required to avoid spring-loaded link 318 if lower attachment pin 507 is used. The distance (or radius) from attachment pin 507 to connector pin 313, which is the pivot axis for hasp 311, is longer than the distance from pin 505 to pin 313. Using lower attachment pin 507 would generate more torque around pin 313 than using upper attachment pin 505 because of the longer radius, which means a smaller or weaker actuator 501 might be used compared to the actuator required for the upper attachment pin 505. However, using lower attachment pin 507 would also require a longer range of movement for overslung crank linkage 502.

Pitch-fold lock 500 may use angular and/or contact sensors as described with respect to pitch-fold lock 400 to monitor and/or control the position of the mechanism.

FIGS. 6A-6C illustrate an exemplary pitch-fold lock 600 utilizing an actuator with an underslung crank arm to move between a fold-locked position and a pitch-locked position. Elements of pitch-fold lock assembly 600 that are common to pitch-fold lock 300 and other example embodiments use similar element labels in the drawings.

The embodiment illustrated in FIGS. 6A-6C shows a pitch-fold lock 600 that uses rotary actuator 601 and underslung crank linkage 602 to actuate the mechanism. Underslung crank linkage 602 is coupled to rotary actuator 601 by actuator arm 603. Underslung crank linkage 602 and actuator arm 603 rotate relative to each other at connector pin 604. As actuator 601 rotates counterclockwise or clockwise, actuator arm 603 moves underslung crank linkage 602 toward or away from blade-stop tab 316, respectively. Underslung crank linkage 602 is attached to hasp 311 at connecting pin 326, which also connects hasp 311 to spring-loaded link 318.

Pitch-fold lock 600 utilizes passive overcenter locking for both directions of pitch and fold locking. Axis 605 (FIG. 6B) illustrates the top dead center position of overcentering fold-lock 301 and the position of spring-loaded link 318 when arm 303 is in the fold-lock position. When hasp 311 is rotated about connection member 313 to the position contacting hard stop 322, spring-loaded link 318 is located above overcenter position 605. When the fold lock 301 is engaged, arm 303 is held in the locked position by spring-loaded link 318 and any force in the fold-unlock direction is resisted by contact between hasp 311 and stop 322. Axis 606 (FIG. 6C) illustrates the top dead center position of overcentering pitch-lock 302 and the position of underslung crank linkage 602 and actuator arm 603 when hasp 311 is in the pitch-lock position. When arm 303 is rotated about connection member 306 to the position contacting hard stop 323, pin 604 between underslung crank linkage 602 and actuator arm 603 rises above the overcenter position 606. When the pitch lock 302 is engaged, hasp 311 is held in the locked position by underslung crank linkage 602 and any force in the pitch-unlock direction is resisted by contact between actuator arm 603 and stop 607 or by actuator 601 reaching the limit of its clockwise rotation. The actuator 601 can fail in either the pitch-lock position or the fold-lock position, and the pitch-fold lock 600 will passively hold the rotor blade in the failed position to allow safe operation of the aircraft.

As noted above, prior solutions placed the actuator at the rotational axis of pin 313 on hasp 311. The mechanism provided in pitch-fold lock 600 utilizes geometry that reduces the overall torque requirements for rotary actuator 601 when compared to prior solutions. The configuration shown in FIGS. 6A-6C allows the actuator 601 to be positioned outward on cuff 305 compared to some other embodiments, which may provide more space for the rotary actuator placement. As best illustrated in FIG. 6A, actuator 601 may be placed under cuff 305 and the shape of actuator arm 602 may have a bent or curved shape that keeps it close to cuff 305 to minimize interference with other rotor components, such as spring-loaded link 318. The positioning of actuator 601 under cuff 305 and the use of a streamlined actuator arm 603 may also reduce the components' exposure to the airstream, which would lower drag forces.

Actuator 601 may be controlled by the FCC or other system in response to pilot inputs or autopilot commands. Actuator 601 and/or the FCC may receive positional feedback using sensors at stops 322, 323, and/or 607, for example. When hasp 311 contacts stop 322, a contact sensor may signal actuator 601 and/or the FCC that the fold lock is engaged. When arm 303 contacts stop 323 or when arm 603 contacts stop 607, a contact sensor may signal actuator 601 and/or the FCC that the pitch lock is engaged. Alternatively, precision angular position sensors at strategic pivot points may be used to monitor the position of the pitch-fold lock mechanism 600 at all times. The position information may be used by the RCC and FCC, such as to control the speed and force of the actuator relative to position during the entire stroke.

FIG. 7 illustrates an exemplary pitch-fold lock 700 utilizing an actuator with an alternative underslung crank arm to move between a fold-locked position and a pitch-locked position. Pitch-fold lock 700 that uses rotary actuator 701 located under cuff 305 and modified underslung crank linkage 702 to actuate the mechanism. Underslung crank linkage 702 is coupled to rotary actuator 701 by a shorter actuator arm 703. Overslung crank linkage 702 and actuator arm 703 rotate relative to each other at connector pin 704. As actuator 701 rotates counterclockwise or clockwise, actuator arm 703 moves underslung crank linkage 572 toward or away from blade-stop tab 316, respectively. Actuation linkage 702 is coupled to hasp 311 at lower attachment pin 705.

Compared to the embodiment illustrated in FIGS. 6A-6C, pitch-fold lock 700 uses a shorter actuator arm 703, a different shaped overslung crank linkage 702, and a different hasp attachment point 705. Underslung crank linkage 702 has an offset connector end 706 that coupled to attachment pin 505. This offset connector end 706 allows linkage 702 to avoid connector pin 326 and linkage 318 through the full range of movement of hasp 311. However, like the prior designs, pitch-fold lock 700 still provides passive overcenter locking for both directions of pitch and fold locking. The actuator 701 can fail in either the pitch-lock position or the fold-lock position, and the pitch-fold lock 700 will passively hold the rotor blade in the failed position to allow safe operation of the aircraft.

In an alternative embodiment, overslung crank linkage 702 may be coupled to upper attachment pin 707 on hasp 311, which may require modification to attachment end 706, such as having a downward curve instead of the upward curve as illustrated. Fewer bends in overslung crank linkage 702 may be required if upper attachment pin 707 is used since use of pin 707 would avoid spring-loaded link 318. The distance (or radius) from attachment pin 705 to connector pin 313, which is the pivot axis for hasp 311, is longer than the distance from pin 707 to pin 313. Using lower attachment pin 705 would generate more torque around pin 313 than using upper attachment pin 707 because of the longer radius, which means a smaller or weaker actuator 501 might be used compared to the actuator required for the upper attachment pin 707. However, using lower attachment pin 705 would also require a longer range of movement for overslung crank linkage 702.

Pitch-fold lock 700 may use angular and/or contact sensors as described with respect to pitch-fold lock 600 to monitor and/or control the position of the mechanism.

FIGS. 8A-8C illustrate an exemplary pitch-fold lock 800 utilizing a linear actuator to move between a fold-locked position and a pitch-locked position. Elements of pitch-fold lock assembly 800 that are common to pitch-fold lock 300 and other example embodiments use similar element labels in the drawings. The embodiment illustrated in FIGS. 8A-8C shows a pitch-fold lock 800 that uses a linear actuator 801 with a shaft 802 to actuate the mechanism. Shaft 802 is coupled to hasp 311 at connecting pin 326, which also connects hasp 311 to spring-loaded link 318.

Pitch-fold lock 800 utilizes passive overcenter locking for fold locking. Axis 803 (FIG. 8B) illustrates the top dead center position of overcentering fold-lock 301 and the position of spring-loaded link 318 when arm 303 is in the fold-lock position. When hasp 311 is rotated about connection member 313 to the position contacting hard stop 322, spring-loaded link 318 is located above overcenter position 803. When the fold lock 301 is engaged, arm 303 is held in the locked position by spring-loaded link 318 and any force in the fold-unlock direction is resisted by contact between hasp 311 and stop 322. The actuator 801 can fail in the fold-lock position, and the pitch-fold lock 800 will passively hold the rotor blade in the failed position to allow safe operation of the aircraft.

Shaft 802 is fully extended when pitch-fold lock 800 is in the pitch-lock position (FIG. 8C). Since shaft 802 does not have a two-part actuator arm and activation linkage configuration as shown in the other examples, pitch-fold lock 800 does not create a passive, overcenter locking configuration for the pitch-lock position. As illustrated in FIG. 8C, linear actuator 801 is pivotably mounted on cuff 305 so that it can rotate between a fold-lock position 803 and a pitch-lock position 804 while following the arc of connector pin 326 around pivot axis 313. Pitch-fold lock 800 utilizes geometry to reduce the overall force requirements for linear actuator 801 when compared to prior solutions.

Linear actuator 801 may be controlled by the FCC or other system in response to pilot inputs or autopilot commands. Linear actuator 801 and/or the FCC may receive positional feedback using sensors at stops 322 and 323, for example. When hasp 311 contacts stop 322, a contact sensor may signal actuator 801 and/or the FCC that the fold lock is engaged. When arm 303 contacts stop 323, a contact sensor may signal actuator 801 and/or the FCC that the pitch lock is engaged. Alternatively, precision angular position sensors at strategic pivot points may be used to monitor the position of the pitch-fold lock mechanism 800 at all times. The position information may be used by the RCC and FCC, such as to control the speed and force of the actuator relative to position during the entire stroke.

FIG. 9 is a cross-sectional view of an exemplary spring-loaded link 900. Spring 901 in this exemplary spring-loaded link 900 may be one or more coned-disc springs. First section 902 is a rod structure having an internal cavity 903 positioned opposite first rod end 904. Second section 905 is a rod structure having a head end 906 opposite second rod end 907. Head end 906 is slidingly disposed in cavity 903. Spring 901 is positioned in cavity 903 and biases first section 902 and second section 905 away from each other. A connector 908 couples first and second sections 902, 905 in a manner allowing linear movement relative to one another. In this example, connector 908 is threadedly connected to first section 902 permitting second section 905 to reciprocate relative to connector 908. In another embodiment, spring 903 may be a gas, e.g., nitrogen, and head end 906 serving as piston reciprocating in a cylinder formed by cavity 903. Cavity 903 and/or head end 906 may include a low-friction coating. Cavity 903 and head end 906 may be constructed of dissimilar metals, e.g. brass and steel, to decrease friction. Cavity 903 may include a lubricant to decrease friction.

Spring-loaded link 900 may be used to connect various components in an aircraft, including without limitation, in a blade fold system of a tiltrotor aircraft or in a landing system. For example, and without limitation, spring-loaded link 900 may be utilized as spring-loaded links 318 in the passive, overcentering pitch-fold locks illustrated herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A blade lock for a tiltrotor aircraft to enable and disable a folding degree of freedom and a pitching degree of freedom of a rotor blade, the blade lock comprising:
   a fold lock adapted to prevent folding of a rotor blade in a fold-lock position and to allow folding of the rotor blade in a pitch-lock position;
   a pitch lock adapted to allow pitch movement of a rotor blade in a fold-lock position and to prevent pitch movement of the rotor blade in the pitch-lock position;
   a spring-loaded link pivotally connected to both the fold lock and the pitch lock and adapted to provide passive, overcenter locking in the fold-lock position;
   an actuator coupled to the pitch lock and adapted to move the pitch lock and the fold lock between the fold-lock and pitch-lock positions, wherein the actuator is a linear actuator having an actuator shaft that is coupled to the pitch lock; and
   an attachment point on the pitch lock, the attachment point separated from a pivot axis of the pitch lock by a specified distance, wherein both the spring-loaded link and the actuator are pivotally connected to the attachment point.

2. The blade lock of claim 1, further comprising:
   a blade-fold link coupled to the rotor blade, wherein the fold lock enables and disables the folding degree of freedom by unlocking and locking the blade-fold link.

3. The blade lock of claim 1, further comprising:
   a rotor cuff tab and a blade-stop tab, wherein the pitch lock enables and disables the pitching degree of freedom by unlocking and locking the rotor cuff tab and the blade-stop tab together.

4. A blade lock for a tiltrotor aircraft to enable and disable a folding degree of freedom and a pitching degree of freedom of a rotor blade, the blade lock comprising:
   a fold lock adapted to prevent folding of a rotor blade in a fold-lock position and to allow folding of the rotor blade in a pitch-lock position;
   a pitch lock adapted to allow pitch movement of a rotor blade in a fold-lock position and to prevent pitch movement of the rotor blade in the pitch-lock position;
   a spring-loaded link pivotally connected to both the fold lock and the pitch lock and adapted to provide passive, overcenter locking in the fold-lock position;
   an actuator coupled to the pitch lock and adapted to move the pitch lock and the fold lock between the fold-lock and pitch-lock positions, wherein the actuator is a linear actuator having an actuator shaft that is coupled to the pitch lock;
   a first attachment point on the pitch lock, the first attachment point separated from a pivot axis of the pitch lock by a first distance; and
   a second attachment point on the pitch lock, the second attachment point separated from the pivot axis of the pitch lock by a second distance that is shorter than the first distance;
   wherein the spring-loaded link is pivotally connected to the first attachment point and the actuator is pivotally connected to the second attachment point.

5. The blade lock of claim 4, further comprising:
   a blade-fold link coupled to the rotor blade, wherein the fold lock enables and disables the folding degree of freedom by unlocking and locking the blade-fold link.

6. The blade lock of claim 4, further comprising:
   a rotor cuff tab and a blade-stop tab, wherein the pitch lock enables and disables the pitching degree of freedom by unlocking and locking the rotor cuff tab and the blade-stop tab together.

7. A blade lock for a tiltrotor aircraft to enable and disable a folding degree of freedom and a pitching degree of freedom of a rotor blade, the blade lock comprising:
   a fold lock adapted to prevent folding of a rotor blade in a fold-lock position and to allow folding of the rotor blade in a pitch-lock position;
   a pitch lock adapted to allow pitch movement of a rotor blade in a fold-lock position and to prevent pitch movement of the rotor blade in the pitch-lock position;
   a spring-loaded link pivotally connected to both the fold lock and the pitch lock and adapted to provide passive, overcenter locking in the fold-lock position;
   an actuator coupled to the pitch lock and adapted to move the pitch lock and the fold lock between the fold-lock and pitch-lock positions, wherein the actuator is a linear actuator having an actuator shaft that is coupled to the pitch lock;
   a first attachment point on the pitch lock, the first attachment point separated from a pivot axis of the pitch lock by a first distance; and
   a second attachment point on the pitch lock, the second attachment point separated from the pivot axis of the pitch lock by a second distance that is longer than the first distance;
   wherein the spring-loaded link is pivotally connected to the first attachment point and the actuator is pivotally connected to the second attachment point.

8. The blade lock of claim 7, further comprising:
   a blade-fold link coupled to the rotor blade, wherein the fold lock enables and disables the folding degree of freedom by unlocking and locking the blade-fold link.

9. The blade lock of claim 7, further comprising:
   a rotor cuff tab and a blade-stop tab, wherein the pitch lock enables and disables the pitching degree of freedom by unlocking and locking the rotor cuff tab and the blade-stop tab together.

* * * * *